United States Patent
Yang et al.

(10) Patent No.: US 11,218,282 B2
(45) Date of Patent: Jan. 4, 2022

(54) FAST ACTIVATION AND DEACTIVATION FOR LOW LATENCY COMMUNICATIONS

(71) Applicant: QUALCOMM Incorporated, San Diego, CA (US)

(72) Inventors: Wei Yang, San Diego, CA (US); Jing Jiang, San Diego, CA (US); Linhai He, San Diego, CA (US); Wanshi Chen, San Diego, CA (US); Tingfang Ji, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/432,767

(22) Filed: Jun. 5, 2019

(65) Prior Publication Data

US 2019/0379518 A1   Dec. 12, 2019

Related U.S. Application Data

(60) Provisional application No. 62/682,812, filed on Jun. 8, 2018.

(51) Int. Cl.
*H04L 5/00* (2006.01)
*H04W 72/04* (2009.01)
*H04L 1/18* (2006.01)

(52) U.S. Cl.
CPC .......... *H04L 5/0098* (2013.01); *H04L 1/1812* (2013.01); *H04L 5/0053* (2013.01); *H04L 5/0094* (2013.01); *H04W 72/042* (2013.01)

(58) Field of Classification Search
CPC ............... H04W 72/042; H04W 72/14; H04W 72/1289; H04W 76/27; H04W 72/04;
(Continued)

(56) References Cited

U.S. PATENT DOCUMENTS

2018/0139734 A1   5/2018   Babaei et al.
2019/0029029 A1*  1/2019   Ohtsuji .................... H04L 5/00
(Continued)

OTHER PUBLICATIONS

Partial International Search Report—PCT/US2019/035815—ISA/EPO—dated Oct. 1, 2019.
(Continued)

*Primary Examiner* — Jung H Park
(74) *Attorney, Agent, or Firm* — Holland & Hart LLP

(57) ABSTRACT

Methods, systems, and devices for wireless communications are described. As described herein, a service type may be configured, activated, and utilized for subsequent communications according to the service type. For example, a user equipment (UE) may monitor a downlink control channel associated with the service type based on configuring the service type and activating the service type, receive downlink messages associated with the service type, or transmit uplink messages associated with the service type. In some cases, the service type may be activated by transmitting a medium access control (MAC) control element (CE) or a downlink control information (DCI) message. When traffic associated with the service type is no longer present, the service type may be deactivated based on a deactivation indication and/or a deactivation timer. In some cases, the service type may include an ultra-reliable low latency communication (URLLC) service or a low latency service.

27 Claims, 21 Drawing Sheets

(58) Field of Classification Search
CPC ............ H04W 72/0446; H04L 5/0053; H04L 5/0094; H04L 5/0098
See application file for complete search history.

(56) References Cited

U.S. PATENT DOCUMENTS

2019/0357300 A1* 11/2019 Zhou ................ H04W 72/0446
2019/0364546 A1* 11/2019 Kwak ................ H04W 72/042

OTHER PUBLICATIONS

Qualcomm: "On supporting SPS on SCells", 3GPP Draft; R2-1711699 on Supporting SPS on SCells, 3rd Generation Partnership Project (3GPP), Mobile Competence Centre; 650, Route Des Lucioles ; F-06921 Sophia-Antipolis Cedex; France, vol. RAN WG2, No. Prague, Czech; Oct. 9, 2017-Oct. 13, 2017, Oct. 8, 2017 (Oct. 8, 2017), XP051343657, 2 Pages, Retrieved from the Internet: URL:http://www.3gpp.org/ftp/Meetings_3GPP_SYNC/RAN2/Docs/ [retrieved on Oct. 8, 2017], Sections 1-3.
International Search Report and Written Opinion—PCT/US2019/035815—ISA/EPO—dated Nov. 29, 2019.

* cited by examiner

FAST ACTIVATION AND DEACTIVATION FOR LOW LATENCY COMMUNICATIONS

CROSS REFERENCE

The present application for patent claims the benefit of U.S. Provisional Patent Application No. 62/682,812 by Yang et al., entitled "Fast Activation and Deactivation For Low Latency Communications," filed Jun. 8, 2018, assigned to the assignee hereof, and expressly incorporated by reference herein.

BACKGROUND

The following relates generally to wireless communications, and more specifically to fast activation and deactivation for low latency communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a set of stringent requirements for reliability and latency may be enforced for a specific service type. For example, a UE and base station may utilize ultra-reliable low latency communications (URLLC) that includes reliability and latency requirements to ensure messages are transmitted and received quickly and correctly. However, in order to meet the latency requirements, the UE may monitor a downlink control channel frequently for scheduling subsequent communications on time. Accordingly, energy consumption at the UE may increase as a result of frequently monitoring the downlink control channel, which may affect performance of the UE in a power limited scenario. Efficient techniques are desired for employing the specific service type.

SUMMARY

The described techniques relate to improved methods, systems, devices, and apparatuses that support fast activation and deactivation for low latency communications. Generally, the described techniques provide for configuring a service type, activating the service type, and communicating according to the service type. For example, a user equipment (UE) may monitor a downlink control channel associated with the service type based on configuring the service type and activating the service type, receive downlink messages associated with the service type, or transmit uplink messages associated with the service type. In some cases, the service type may be activated by transmitting a medium access control (MAC) control element (CE) or a downlink control information (DCI) message. When traffic associated with the service type is no longer present, the service type may be deactivated based on a deactivation indication and/or a deactivation timer. In some cases, the service type may include an ultra-reliable low latency communication (URLLC) service or a low latency service.

A method of wireless communications at a UE is described. The method may include receiving, from a base station, a configuration for a service type, receiving, from the base station, an activation indicator indicating that the UE is to begin monitoring for the service type, monitoring a downlink control channel associated with the service type based on the configuration for the service type and receipt of the activation indicator, and receiving a downlink message associated with the service type in accordance with the configuration for the service type.

An apparatus for wireless communications at a UE is described. The apparatus may include a processor, memory coupled with the processor, and instructions stored in the memory. The instructions may be executable by the processor to cause the apparatus to receive, from a base station, a configuration for a service type, receive, from the base station, an activation indicator indicating that the UE is to begin monitoring for the service type, monitor a downlink control channel associated with the service type based on the configuration for the service type and receipt of the activation indicator, and receive a downlink message associated with the service type in accordance with the configuration for the service type.

Another apparatus for wireless communications at a UE is described. The apparatus may include means for receiving, from a base station, a configuration for a service type, receiving, from the base station, an activation indicator indicating that the UE is to begin monitoring for the service type, monitoring a downlink control channel associated with the service type based on the configuration for the service type and receipt of the activation indicator, and receiving a downlink message associated with the service type in accordance with the configuration for the service type.

A non-transitory computer-readable medium storing code for wireless communications at a UE is described. The code may include instructions executable by a processor to receive, from a base station, a configuration for a service type, receive, from the base station, an activation indicator indicating that the UE is to begin monitoring for the service type, monitor a downlink control channel associated with the service type based on the configuration for the service type and receipt of the activation indicator, and receive a downlink message associated with the service type in accordance with the configuration for the service type.

In some examples of the method, apparatuses, and non-transitory computer-readable medium described herein, receiving the activation indicator may include operations, features, means, or instructions for receiving, from the base station, a MAC CE activating a service type mode.

In some examples of the method, apparatuses, and non-transitory computer-readable medium described herein, receiving the MAC CE may include operations, features, means, or instructions for receiving the MAC CE that includes a sub-header and an associated content field that includes the activation indicator corresponding to the service type.

In some examples of the method, apparatuses, and non-transitory computer-readable medium described herein, the associated content field includes additional information for the service type, a number of activated data radio bearers, or a combination thereof.

In some examples of the method, apparatuses, and non-transitory computer-readable medium described herein, receiving the MAC CE may include operations, features, means, or instructions for receiving the MAC CE that includes a sub-header corresponding to the service type without an associated content field, where the sub-header may be the activation indicator which triggers a state change from a service type inactive mode to a service type active mode.

In some examples of the method, apparatuses, and non-transitory computer-readable medium described herein, receiving the activation indicator may include operations, features, means, or instructions for receiving, from the base station, layer one signaling activating a service type mode.

In some examples of the method, apparatuses, and non-transitory computer-readable medium described herein, receiving the layer one signaling may include operations, features, means, or instructions for receiving a DCI message that includes a service type DCI format with the activation indicator.

In some examples of the method, apparatuses, and non-transitory computer-readable medium described herein, receiving the layer one signaling may include operations, features, means, or instructions for receiving a DCI message that includes a combination of fields that may be jointly interpreted as the activation indicator.

In some examples of the method, apparatuses, and non-transitory computer-readable medium described herein, receiving the layer one signaling may include operations, features, means, or instructions for monitoring a DCI message based on a configured periodicity that may be greater than a periodicity for monitoring the downlink channel associated with the service type.

In some examples of the method, apparatuses, and non-transitory computer-readable medium described herein, the DCI message may be scrambled by a radio network temporary identifier (RNTI) associated with the service type.

Some examples of the method, apparatuses, and non-transitory computer-readable medium described herein may further include operations, features, means, or instructions for monitoring the DCI message using the RNTI associated with the service type.

Some examples of the method, apparatuses, and non-transitory computer-readable medium described herein may further include operations, features, means, or instructions for receiving, from the base station, a deactivation indicator indicating that the UE may be to stop monitoring for the service type.

In some examples of the method, apparatuses, and non-transitory computer-readable medium described herein, receiving the deactivation indicator may include operations, features, means, or instructions for receiving a MAC CE deactivating a service type mode, where the MAC CE includes a sub-header and an associated content field that includes the deactivation indicator corresponding to service type.

In some examples of the method, apparatuses, and non-transitory computer-readable medium described herein, receiving the deactivation indicator may include operations, features, means, or instructions for receiving a MAC CE deactivating a service type mode, where the MAC CE includes a sub-header corresponding to service type without an associated content field, the sub-header being the deactivation indicator which triggers a state change from a service type active mode to a service type inactive mode.

In some examples of the method, apparatuses, and non-transitory computer-readable medium described herein, receiving the deactivation indicator may include operations, features, means, or instructions for receiving a DCI message that includes a service type DCI format with the deactivation indicator.

In some examples of the method, apparatuses, and non-transitory computer-readable medium described herein, receiving the deactivation indicator may include operations, features, means, or instructions for receiving a DCI message that includes a combination of fields that may be jointly interpreted as the deactivation indicator.

In some examples of the method, apparatuses, and non-transitory computer-readable medium described herein, receiving the activation indicator may include operations, features, means, or instructions for receiving additional information to update the configuration for the service type.

In some examples of the method, apparatuses, and non-transitory computer-readable medium described herein, receiving the configuration for the service type further may include operations, features, means, or instructions for receiving a value for a deactivation timer associated with the service type.

Some examples of the method, apparatuses, and non-transitory computer-readable medium described herein may further include operations, features, means, or instructions for initiating the deactivation timer based on receiving the activation indicator.

Some examples of the method, apparatuses, and non-transitory computer-readable medium described herein may further include operations, features, means, or instructions for deactivating the service type based on the deactivation timer expiring, not expecting a downlink hybrid access request (HARQ) retransmission, no data in a HARQ buffer for an uplink retransmission, no uplink data for the service type, or a combination thereof.

Some examples of the method, apparatuses, and non-transitory computer-readable medium described herein may further include operations, features, means, or instructions for adjusting the deactivation timer based on not receiving a service type communication associated with the service type within a scheduling occasion for the service type communication.

Some examples of the method, apparatuses, and non-transitory computer-readable medium described herein may further include operations, features, means, or instructions for receiving a semi-persistent scheduling (SPS) configuration for uplink and downlink communications associated with the service type and receiving an SPS activation indicator indicating that the UE may be to begin monitoring in accordance with the SPS configuration, where monitoring the downlink channel associated with the service type may be based on receipt of both the activation indicator and the SPS activation indicator.

In some examples of the method, apparatuses, and non-transitory computer-readable medium described herein, the configuration for the service type includes parameters for a physical downlink control channel (PDCCH), a physical downlink shared channel (PDSCH), a physical uplink control channel (PUCCH), a physical uplink shared channel (PUSCH), SPS, a scheduling request (SR), or a combination thereof for the service type.

In some examples of the method, apparatuses, and non-transitory computer-readable medium described herein, the configuration for the service type may be received via radio resource control (RRC) signaling.

In some examples of the method, apparatuses, and non-transitory computer-readable medium described herein, the service type includes a URLLC service or a low latency service.

A method of wireless communications at a UE is described. The method may include receiving, from a base station, a configuration for a service type, identifying uplink traffic associated with the service type, transmitting, to the base station, an SR based on identifying the uplink traffic associated with the service type, activating a service type mode for monitoring for a grant for the service type based on transmission of the SR, monitoring a downlink channel based on the configuration for monitoring the service type, receiving, from the base station, an uplink grant for the identified uplink traffic via the downlink channel, and transmitting, to the base station, the uplink traffic associated with the service type based on receiving the uplink grant.

An apparatus for wireless communications at a UE is described. The apparatus may include a processor, memory coupled with the processor, and instructions stored in the memory. The instructions may be executable by the processor to cause the apparatus to receive, from a base station, a configuration for a service type, identify uplink traffic associated with the service type, transmit, to the base station, an SR based on identifying the uplink traffic associated with the service type, activate a service type mode for monitoring for a grant for the service type based on transmission of the SR, monitor a downlink channel based on the configuration for monitoring the service type, receive, from the base station, an uplink grant for the identified uplink traffic via the downlink channel, and transmit, to the base station, the uplink traffic associated with the service type based on receiving the uplink grant.

Another apparatus for wireless communications at a UE is described. The apparatus may include means for receiving, from a base station, a configuration for a service type, identifying uplink traffic associated with the service type, transmitting, to the base station, an SR based on identifying the uplink traffic associated with the service type, activating a service type mode for monitoring for a grant for the service type based on transmission of the SR, monitoring a downlink channel based on the configuration for monitoring the service type, receiving, from the base station, an uplink grant for the identified uplink traffic via the downlink channel, and transmitting, to the base station, the uplink traffic associated with the service type based on receiving the uplink grant.

A non-transitory computer-readable medium storing code for wireless communications at a UE is described. The code may include instructions executable by a processor to receive, from a base station, a configuration for a service type, identify uplink traffic associated with the service type, transmit, to the base station, an SR based on identifying the uplink traffic associated with the service type, activate a service type mode for monitoring for a grant for the service type based on transmission of the SR, monitor a downlink channel based on the configuration for monitoring the service type, receive, from the base station, an uplink grant for the identified uplink traffic via the downlink channel, and transmit, to the base station, the uplink traffic associated with the service type based on receiving the uplink grant.

Some examples of the method, apparatuses, and non-transitory computer-readable medium described herein may further include operations, features, means, or instructions for receiving, from the base station, a deactivation indicator indicating that the UE may be to stop the service type mode and deactivating the service type mode based on receiving the deactivation indicator.

In some examples of the method, apparatuses, and non-transitory computer-readable medium described herein, receiving the deactivation indicator further may include operations, features, means, or instructions for receiving a MAC CE or a DCI message that includes a service type DCI format that indicates a stop to the service type mode.

Some examples of the method, apparatuses, and non-transitory computer-readable medium described herein may further include operations, features, means, or instructions for activating a PDCCH configuration associated with the service type based on transmitting the SR and monitoring the downlink channel based on the PDCCH configuration.

In some examples of the method, apparatuses, and non-transitory computer-readable medium described herein, the PDCCH configuration includes at least a control resource set configuration and a search space configuration.

Some examples of the method, apparatuses, and non-transitory computer-readable medium described herein may further include operations, features, means, or instructions for receiving the uplink grant via a DCI message that includes a service type DCI format, that is scrambled by an RNTI associated with the service type, or a combination thereof.

In some examples of the method, apparatuses, and non-transitory computer-readable medium described herein, the configuration for the service type includes parameters for a PDCCH, a PDSCH, a PUCCH, a PUSCH, SPS, an SR, or a combination thereof for the service type.

In some examples of the method, apparatuses, and non-transitory computer-readable medium described herein, the configuration for the service type may be received via RRC signaling.

In some examples of the method, apparatuses, and non-transitory computer-readable medium described herein, the service type includes a URLLC service or a low latency service.

A method of wireless communications at a base station is described. The method may include transmitting, to a UE, a configuration for a service type, identifying traffic associated with the service type, transmitting, to the UE, an activation indicator indicating that the UE is to begin monitoring for the service type based on the identifying the traffic associated with the service type, and transmitting a downlink message associated with the service type in accordance with the configuration for the service type.

An apparatus for wireless communications at a base station is described. The apparatus may include a processor, memory coupled with the processor, and instructions stored in the memory. The instructions may be executable by the processor to cause the apparatus to transmit, to a UE, a configuration for a service type, identify traffic associated with the service type, transmit, to the UE, an activation indicator indicating that the UE is to begin monitoring for the service type based on the identifying the traffic associated with the service type, and transmit a downlink message associated with the service type in accordance with the configuration for the service type.

Another apparatus for wireless communications at a base station is described. The apparatus may include means for transmitting, to a UE, a configuration for a service type, identifying traffic associated with the service type, transmitting, to the UE, an activation indicator indicating that the UE is to begin monitoring for the service type based on the identifying the traffic associated with the service type, and transmitting a downlink message associated with the service type in accordance with the configuration for the service type.

A non-transitory computer-readable medium storing code for wireless communications at a base station is described. The code may include instructions executable by a processor to transmit, to a UE, a configuration for a service type, identify traffic associated with the service type, transmit, to the UE, an activation indicator indicating that the UE is to begin monitoring for the service type based on the identifying the traffic associated with the service type, and transmit a downlink message associated with the service type in accordance with the configuration for the service type.

In some examples of the method, apparatuses, and non-transitory computer-readable medium described herein, transmitting the activation indicator may include operations, features, means, or instructions for transmitting, to the UE, a MAC CE activating a service type mode.

In some examples of the method, apparatuses, and non-transitory computer-readable medium described herein, transmitting the MAC CE may include operations, features, means, or instructions for transmitting the MAC CE that includes a sub-header and an associated content field that includes the activation indicator corresponding to the service type.

In some examples of the method, apparatuses, and non-transitory computer-readable medium described herein, the associated content field includes additional information for the service type, a number of activated data radio bearers, or a combination thereof.

In some examples of the method, apparatuses, and non-transitory computer-readable medium described herein, transmitting the MAC CE may include operations, features, means, or instructions for transmitting the MAC CE that includes a sub-header corresponding to the service type without an associated content field, where the sub-header may be the activation indicator which triggers a state change from a service type inactive mode to a service type active mode.

In some examples of the method, apparatuses, and non-transitory computer-readable medium described herein, transmitting the activation indicator may include operations, features, means, or instructions for transmitting, to the UE, layer one signaling activating a service type mode.

In some examples of the method, apparatuses, and non-transitory computer-readable medium described herein, transmitting the layer one signaling may include operations, features, means, or instructions for transmitting a DCI message that includes a service type DCI format with the activation indicator.

In some examples of the method, apparatuses, and non-transitory computer-readable medium described herein, transmitting the layer one signaling may include operations, features, means, or instructions for transmitting a DCI message that includes a combination of fields that may be jointly interpreted as the activation indicator.

Some examples of the method, apparatuses, and non-transitory computer-readable medium described herein may further include operations, features, means, or instructions for transmitting, to the UE, a deactivation indicator indicating that the UE may be to stop monitoring for the service type.

In some examples of the method, apparatuses, and non-transitory computer-readable medium described herein, transmitting the deactivation indicator may include operations, features, means, or instructions for transmitting a MAC CE deactivating a service type mode, where the MAC CE includes a sub-header and an associated content field that includes the deactivation indicator corresponding to service type.

In some examples of the method, apparatuses, and non-transitory computer-readable medium described herein, transmitting the deactivation indicator may include operations, features, means, or instructions for transmitting a MAC CE deactivating a service type mode, where the MAC CE includes a sub-header corresponding to service type without an associated content field, the sub-header being the deactivation indicator which triggers a state change from a service type active mode to a service type inactive mode.

In some examples of the method, apparatuses, and non-transitory computer-readable medium described herein, transmitting the deactivation indicator may include operations, features, means, or instructions for transmitting a DCI message that includes a service type DCI format with the deactivation indicator.

In some examples of the method, apparatuses, and non-transitory computer-readable medium described herein, transmitting the deactivation indicator may include operations, features, means, or instructions for transmitting a DCI message that includes a combination of fields that may be jointly interpreted as the deactivation indicator.

In some examples of the method, apparatuses, and non-transitory computer-readable medium described herein, transmitting the activation indicator may include operations, features, means, or instructions for transmitting additional information to update the configuration for the service type.

In some examples of the method, apparatuses, and non-transitory computer-readable medium described herein, transmitting the configuration for the service type further may include operations, features, means, or instructions for transmitting a value for a deactivation timer associated with the service type.

Some examples of the method, apparatuses, and non-transitory computer-readable medium described herein may further include operations, features, means, or instructions for transmitting a SPS configuration for uplink and downlink communications associated with the service type and transmitting an SPS activation indicator indicating that the UE may be to begin monitoring in accordance with the SPS configuration.

In some examples of the method, apparatuses, and non-transitory computer-readable medium described herein, the configuration for the service type includes parameters for a PDCCH, a PDSCH, a PUCCH, a PUSCH, SPS, an SR, or a combination thereof for the service type.

In some examples of the method, apparatuses, and non-transitory computer-readable medium described herein, the configuration for the service type may be transmitted via RRC signaling.

In some examples of the method, apparatuses, and non-transitory computer-readable medium described herein, the service type includes a URLLC service or a low latency service.

A method of wireless communications at a base station is described. The method may include transmitting, to a UE, a configuration for a service type, receiving, from the UE, an SR for uplink traffic associated with the service type, transmitting, to the UE, an uplink grant for the uplink traffic indicated in the SR, and receiving the uplink traffic associated with the service type based on transmitting the uplink grant.

An apparatus for wireless communications at a base station is described. The apparatus may include a processor, memory coupled with the processor, and instructions stored in the memory. The instructions may be executable by the processor to cause the apparatus to transmit, to a UE, a configuration for a service type, receive, from the UE, an SR for uplink traffic associated with the service type, transmit, to the UE, an uplink grant for the uplink traffic indicated in the SR, and receive the uplink traffic associated with the service type based on transmitting the uplink grant.

Another apparatus for wireless communications at a base station is described. The apparatus may include means for transmitting, to a UE, a configuration for a service type, receiving, from the UE, an SR for uplink traffic associated with the service type, transmitting, to the UE, an uplink grant for the uplink traffic indicated in the SR, and receiving the uplink traffic associated with the service type based on transmitting the uplink grant.

A non-transitory computer-readable medium storing code for wireless communications at a base station is described. The code may include instructions executable by a processor to transmit, to a UE, a configuration for a service type, receive, from the UE, an SR for uplink traffic associated with the service type, transmit, to the UE, an uplink grant for the uplink traffic indicated in the SR, and receive the uplink traffic associated with the service type based on transmitting the uplink grant.

Some examples of the method, apparatuses, and non-transitory computer-readable medium described herein may further include operations, features, means, or instructions for transmitting, to the UE, a deactivation indicator indicating that the UE may be to stop the service type mode.

In some examples of the method, apparatuses, and non-transitory computer-readable medium described herein, transmitting the deactivation indicator may include operations, features, means, or instructions for transmitting a MAC CE or a DCI message that includes a service type DCI format that indicates a stop to the service type mode.

Some examples of the method, apparatuses, and non-transitory computer-readable medium described herein may further include operations, features, means, or instructions for transmitting the uplink grant via a DCI message that includes a service type DCI format, that is scrambled by an RNTI associated with the service type, or a combination thereof.

In some examples of the method, apparatuses, and non-transitory computer-readable medium described herein, the configuration for the service type includes parameters for a PDCCH, a PDSCH, a PUCCH, a PUSCH, SPS, an SR, or a combination thereof for the service type.

In some examples of the method, apparatuses, and non-transitory computer-readable medium described herein, the configuration for the service type may be transmitted via RRC signaling.

In some examples of the method, apparatuses, and non-transitory computer-readable medium described herein, the service type includes a URLLC service or a low latency service.

DETAILED DESCRIPTION

Figure 1:
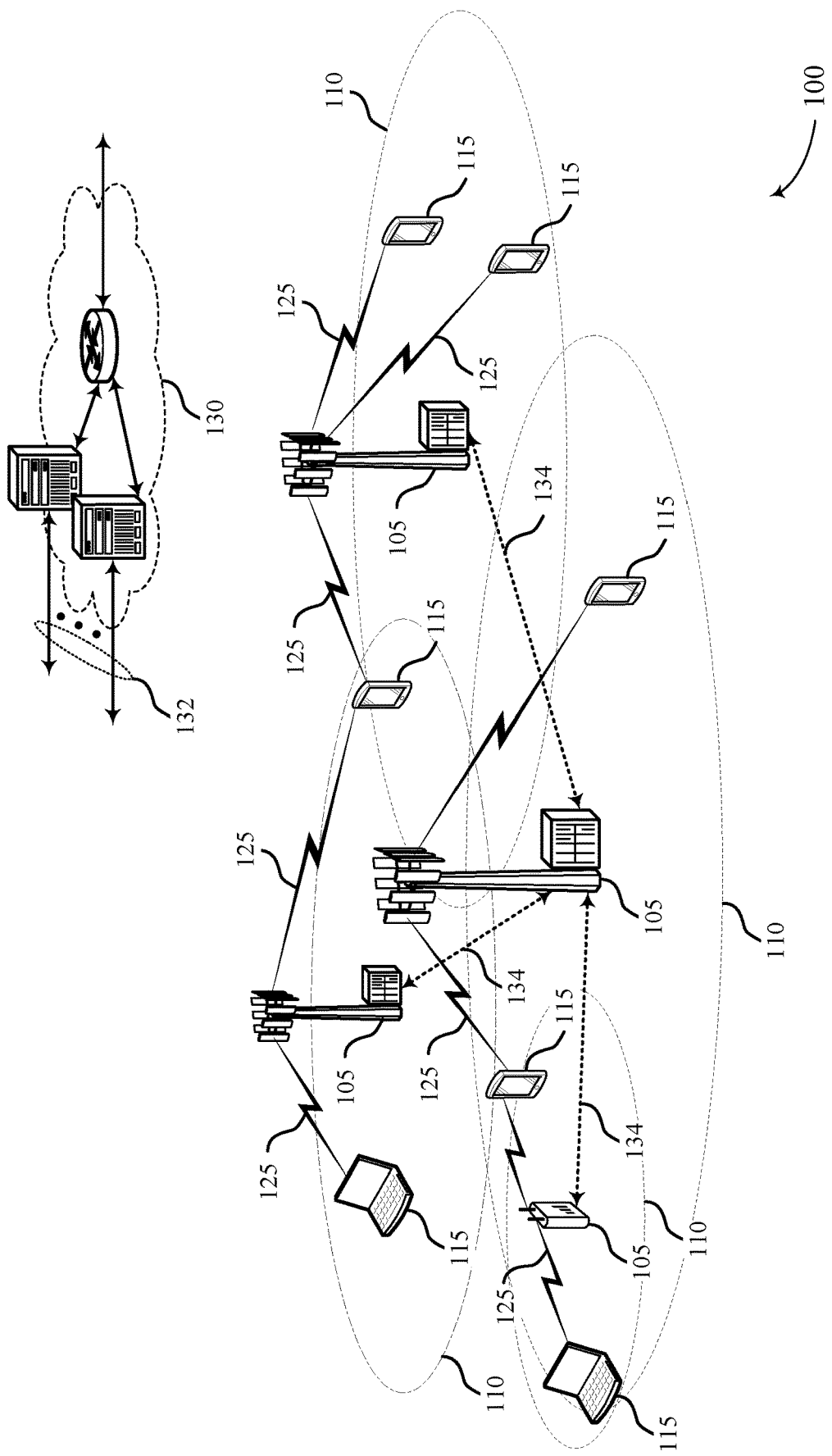
FIG. 1 illustrates an example of a system for wireless communications that supports fast activation and deactivation for low latency communications in accordance with aspects of the present disclosure.

Some wireless communications systems may require a set of reliability and latency specifications to enable a service where messages are communicated correctly and on time. For example, the service may include an ultra-reliable low latency communication (URLLC) service for one or more user equipments (UEs) and base stations. The URLLC may include a requirement associated with reliability (e.g., $1 \times 10^{-5}$ block error ratio (BLER)) and a requirement associated with latency (e.g., 1 millisecond (ms) end-to-end). To satisfy the latency requirement, a UE may monitor a downlink control channel for indications that traffic associated with the service is upcoming (e.g., a downlink transmission incoming or an uplink transmission to be sent). As such, the UE may waste power frequently monitoring the downlink control channel for indications of the service, thereby reducing battery life for the UE.

As described herein, a mechanism to activate and deactivate the service (e.g., URLLC) may be employed at a UE to satisfy latency requirements while also conserving power at the UE when traffic associated with the service is not present. For example, when traffic associated with the service (e.g., URLLC traffic) is present, the UE may receive an indication from a base station to activate a mode associated with the service. In some cases, the base station may determine to transmit the activation indication based on upcoming downlink transmissions associated with the service. Additionally or alternatively, the UE may identify uplink transmissions associated with the service and transmit a scheduling request (SR) to the base station, where the activation indication is transmitted based on the SR. The base station may transmit the activation indication via a medium access control (MAC) control element (CE) or via layer 1 (L1) signaling, where the L1 signaling may include a downlink control information (DCI) message. After receiving the activation indication, the UE may monitor the downlink control channel for traffic associated with the service and/or transmit uplink traffic to the base station based on configurations for uplink and downlink channels received previously via higher layer signaling (e.g., radio resource control (RRC) signaling). When traffic associated with the service is no longer present, the base station may transmit an indication to deactivate the mode associated with the service. Additionally or alternatively, when activating the service mode, a timer may be initiated such that when the timer expires and no traffic associated with the service is present, the UE may deactivate the service mode.

Aspects of the disclosure are initially described in the context of a wireless communications system. An additional wireless communications system, a control element mapping scheme, and process flows are then provided to portray aspects of the disclosure. Aspects of the disclosure are further illustrated by and described with reference to apparatus diagrams, system diagrams, and flowcharts that relate to fast activation and deactivation for low latency communications.

FIG. 1 illustrates an example of a wireless communications system 100 that supports fast activation and deactivation for low latency communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems may require a set of reliability and latency specifications to enable a service where messages are communicated correctly and on time. For example, the service may include URLLC for one or more UEs 115 and base stations 105. The URLLC may include a requirement associated with reliability (e.g., $10^{-5}$ BLER) and a requirement associated with latency (e.g., 1 ms end-to-end latency). To satisfy the latency requirement, a UE 115 may monitor a downlink control channel (e.g., PDCCH) for indications that traffic associated with the service is upcoming (e.g., a downlink transmission incoming or an uplink transmission to be sent). In some cases, to meet the latency requirements of URLLC, a UE 115 may monitor a PDCCH more frequently than periodic monitoring of the PDCCH performed to support other non-critical latency services. More frequent PDCCH monitoring may lead to higher energy consumption, for example, at a UE 115. Accordingly, the fast URLLC activation and deactivation may increase energy efficiency (e.g., decrease higher energy consumption for URLLC due to more frequent PDCCH monitoring) at a UE 115.

Wireless communications system 100 may support efficient techniques to activate and deactivate the service (e.g., URLLC) at a UE 115 to satisfy latency requirements for traffic associated with the service while also conserving power at the UE 115 when the traffic associated with the service is not present. For example, a base station may identify downlink traffic associated with the service and transmit an indication for the UE 115 to activate a mode associated with the service. In some cases, the base station 105 may transmit the indication to activate the service mode via a MAC CE or via a DCI message (e.g., L1 signaling). After receiving the activation indication, the UE 115 and base station 105 may communicate according to configurations for uplink and downlink channels received previously via higher layer signaling (e.g., RRC signaling). Additionally or alternatively, the UE 115 may identify uplink transmissions associated with the service and transmit an SR to the base station 105, where the UE 115 subsequently receives the uplink grant to transmit the uplink traffic associated with the service. When traffic associated with the service is no longer present, the UE 115 may deactivate the service mode based on receiving an indication from the base station 105 to deactivate the service mode and/or based on a deactivation timer expiring.

Figure 2:
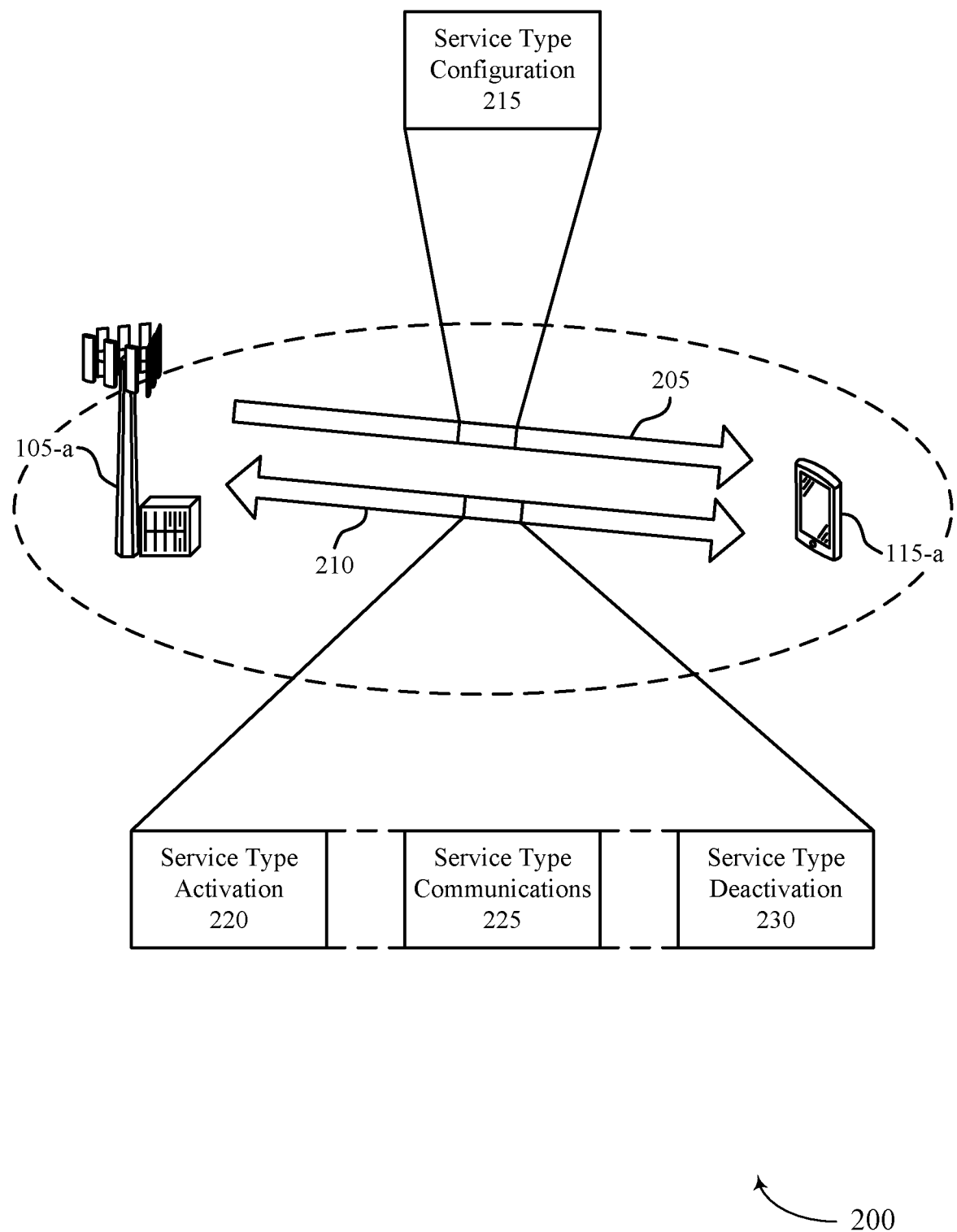
FIG. 2 illustrates an example of a wireless communications system that supports fast activation and deactivation for low latency communications in accordance with aspects of the present disclosure.

FIG. 2 illustrates an example of a wireless communications system 200 that supports fast activation and deactivation for low latency communications in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115 as described above with reference to FIG. 1. In some cases, base station 105-a and UE 115-a may be configured to operate according to a service type that includes low latency and high reliability requirements. For example, the service type may include URLLC with an associated reliability requirement and a latency requirement (e.g., $10^{-5}$ BLER reliability and a 1 ms end-to-end latency bound for a packet size of 32 bytes). Wireless communications system 200 may include signaling for a fast activation and deactivation of the service type to operate within the latency requirements and provide efficient battery usage at UE 115-a.

Initially, base station 105-a may configure parameters for communications associated with the service type. For example, base station 105-a transmit a service type configuration 215 on resources of a carrier 205 to UE 115-a, where service type configuration 215 includes configurations of channels to be utilized for the service type. For example, service type configuration 215 may include configurations for PDCCHs, physical downlink shared channels (PDSCHs), physical uplink control channels (PUCCHs), physical uplink shared channels (PUSCHs), semi-persistent scheduling (SPS), SRs, etc. Accordingly, when operating according to the service type, base station 105-a and UE 115-a may utilize the channel configurations signaled in service type configuration 215. In some cases, base station 105-a may transmit service type configuration 215 via higher layer signaling on carrier 205. For example, service type configuration 215 may be transmitted via RRC signaling.

After transmitting service type configuration 215, base station 105-a and UE 115-a may communicate on resources of a carrier 210. In some cases, carriers 205 and 210 may be the same, where service type configuration 215 and subsequent communications are transmitted over the same resources of one carrier, or carriers 205 and 210 may be different, where service type configuration 215 is transmitted on resources of a first carrier (e.g., carrier 205) and the subsequent communications are transmitted on resources of a second carrier (e.g., carrier 210). In some cases, traffic associated with the service type may be identified by base station 105-a (e.g., downlink initiated) and/or UE 115-a (e.g., uplink initiated). Accordingly, base station 105-a may transmit a service type activation 220 (e.g., URLLC activation command), which may indicate to UE 115-a to activate a mode associated with the service type.

In some cases, base station 105-a may transmit service type activation 220 via a MAC CE. For example, an activation/deactivation MAC CE may be defined and transmitted as service type activation 220. The MAC CE may include a MAC CE content that includes information about upcoming traffic associated with the service type and an indication of whether to activate or deactivate the service type mode. Alternatively, the MAC CE may trigger a state change for UE 115-a. For example, if UE 115-a is in an inactive state or mode, then the MAC CE may activate the service type, otherwise it may deactivate the service type. Additionally or alternatively, base station 105-a may transmit service type activation 220 via L1 signaling. For example, the L1 signaling may include a new DCI format introduced to activate/deactivate the service type mode or an existing DCI format reused, where combinations of fields in the existing DCI format are used to activate/deactivate the service type. In some cases, UE 115-a may monitor a DCI message based on a configured periodicity that is greater than a periodicity for monitoring the downlink channel associated with the service type. Additionally, in such cases, the DCI message may be scrambled by an radio network temporary identifier (RNTI) associated with the service type, and UE 115-a may monitor the DCI message using the RNTI associated with the service type.

Consequently, once UE 115-a activates the service type mode, base station 105-a and UE 115-a may utilize service type communications 225. For example, as part of service type communications 225, UE 115-a may monitor a PDCCH according to a search space configuration and/or control resource set (CORESET) configuration, where the PDCCH and search space/CORESET configuration may be included in service type configuration 215. By monitoring PDCCHs, UE 115-a may receive an indication of subsequent traffic associated with the service type and then, accordingly, receive the subsequent traffic. Additionally or alternatively, UE 115-a may transmit uplink messages on an uplink channel (e.g., PUCCH or PUSCH) as part of service type communications 225.

When traffic associated with the service type is no longer present, base station 105-a may transmit a service type deactivation 230 (e.g., URLLC deactivation command) to UE 115-a. Accordingly, UE 115-a may deactivate the service type mode and stop associated procedures for the service type. For example, UE 115-a may stop monitoring PDCCHs aimed for traffic associated with the service type. Additionally or alternatively, UE 115-a and base station 105-a may deactivate the service type mode without explicit signaling (e.g., service type deactivation 230). For example, a deactivation timer associated with the service type may be defined, where the initial value for the deactivation timer is configured via higher layer signaling (e.g., RRC). As such, when the deactivation timer expires and no traffic associated with the service type is present, UE 115-a may deactivate the service type mode.

In some cases, service type communications 225 may further include downlink and/or uplink SPS for the service type, where resources and parameters for the SPS are included in service type configuration 215. The downlink and/or uplink SPSs may include uplink transmissions with a configured grant type 1, uplink transmissions with a configured grant type 2, and downlink SPS. Accordingly, a DCI may be needed to activate and deactivate the uplink transmissions with the configured grant type 2 and the downlink SPS, where UE 115-a is configured to monitor the DCI for the activation and deactivation for the SPS (e.g., SPS-activation DCI), and the uplink transmissions with the configured grant type 1 may not need a DCI for activation or deactivation. Additionally, UE 115-a may be configured with SR resources for the service type. As such, UE 115-a may transmit a 1-bit positive SR if uplink traffic associated with the service type arrives at UE 115-a, and base station 105-a may transmit an uplink grant for the service type upon receiving the 1-bit positive SR.

Operations associated with the SPS and SR for the service type may be independent of the activation and deactivation of the service type. Alternatively, the operations associated with the SPS and SR for the service type may be utilized when the service type mode is activated. Accordingly, UE 115-a may monitor the SPS-activation DCI to activate the uplink transmissions with configured grant type 2 and the downlink SPS when in the active service type mode, and the uplink transmissions with configured grant type 1 and SRs are activated when service type activation 220 is received by UE 115-a from base station 105-a.

Figure 3:
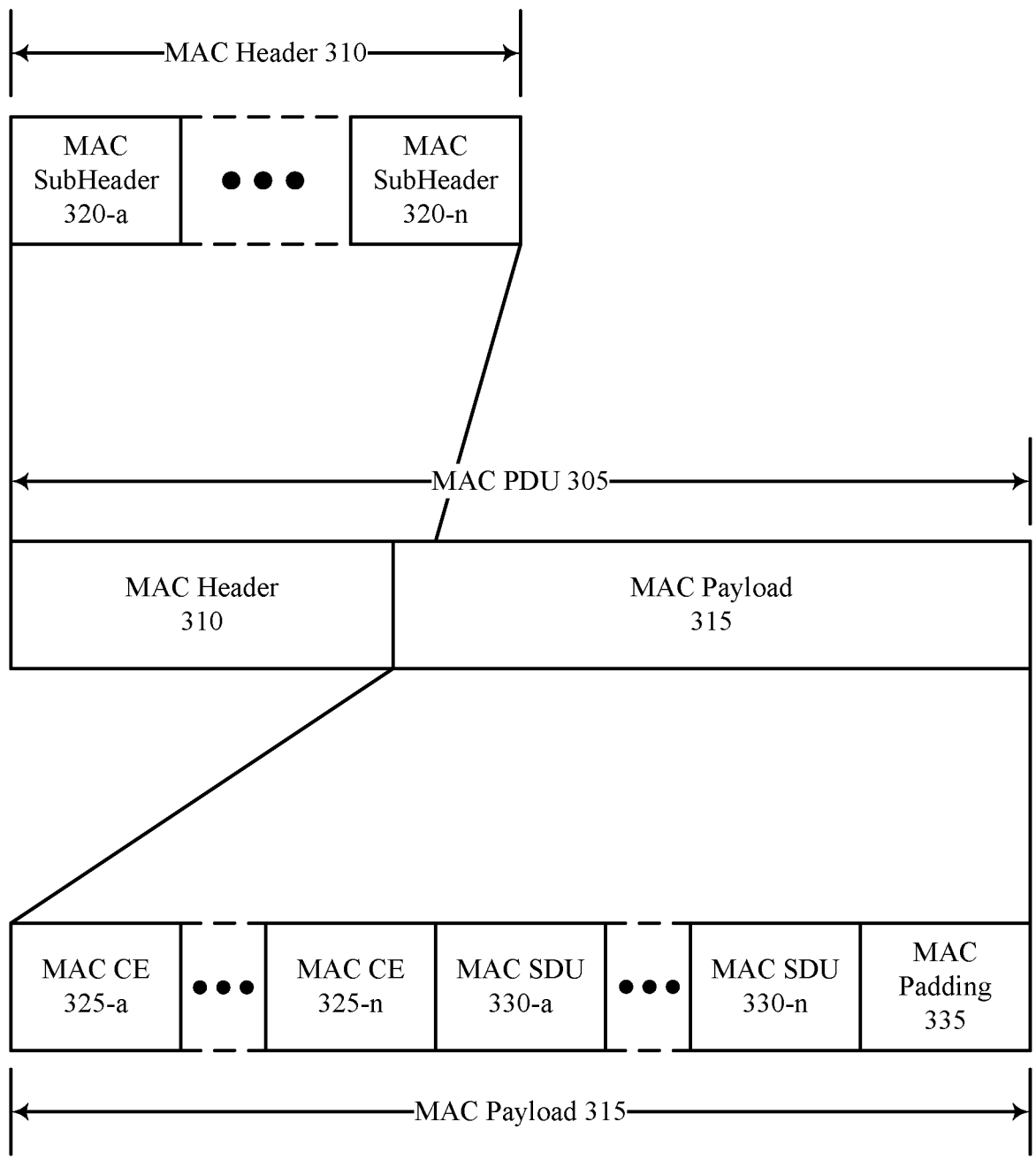
FIG. 3 illustrates an example of a medium access control (MAC) mapping scheme that supports fast activation and deactivation for low latency communications in accordance with aspects of the present disclosure.

FIG. 3 illustrates an example of a MAC mapping scheme 300 that supports fast activation and deactivation for low latency communications in accordance with aspects of the present disclosure. In some examples, MAC mapping scheme 300 may implement aspects of wireless communications systems 100 and/or 200. As described herein, a base station 105 may transmit a MAC packet data unit (PDU) 305 to a UE 115 to activate and/or deactivate a mode associated with a service type (e.g., URLLC). MAC PDU 305 may include a MAC header 310 and a MAC payload 315. In some cases, MAC PDU 305 may be part of layer 2 (L2) signaling.

MAC header 310 may include one or more MAC subheaders 320. Each MAC subheader 320 may contain a logical channel identification (LCID) of one MAC CE 325 in MAC payload 315, which indicates a type of the MAC CE 325. For example, the types of MAC CEs 325 may include CEs for power control, a secondary cell activation/deactivation in a CA configuration, service type mode activation/deactivation, etc. Accordingly, each MAC subheader 320 may map to a separate MAC CE 325 in MAC payload 315. MAC payload 315 may further include one or more MAC service data units (SDUs) 330 and a MAC padding 335, where MAC SDUs 330 include additional information for the UE 115 and MAC padding 335 fills out the rest of MAC PDU 305 in cases where MAC SDUs 330 are small and do not fill MAC PDU 305.

As described herein, when a MAC CE 325 is defined for activating/deactivating the service type mode, an LCID may be allocated for this MAC CE 325. As such, if the base station 105 signals the LCID in a MAC subheader 320, the UE 115 may receive the corresponding MAC CE 325 and activate or deactivate the service type mode accordingly. In some cases, the MAC CE 325 may include a MAC subheader 320 (e.g., with the LCID indicating the MAC CE 325 type) and a MAC CE content. This MAC CE content may include additional information about upcoming traffic associated with the service type, an indication of whether to activate or deactivate the service type mode, updates for channel configurations associated with the service type, or a combination thereof. For example, the additional information may include which data radio bearers (DRBs) for the service type are to be activated (e.g., the UE 115 may be configured with 5 DRBs and 2 DRBs are activated based on the additional information) and the indication of whether to activate or deactivate the service type mode may include a 1-bit indication for the desired mode. Alternatively, the MAC CE 325 may include the MAC subheader 320 (e.g., with the LCID indicating the MAC CE 325 type) but no MAC CE content. In such cases, depending on the current service type mode for the UE 115, the MAC CE 325 may trigger a state change for the current service type mode. For example, if the UE 115 is in an inactive service type mode (e.g., service type is deactivated), the MAC CE 325 may activate the service type mode; otherwise, the MAC CE 325 may deactivate the service type. In some cases, separate MAC CEs 325 may be used for activation and deactivation. For example, a first MAC CE 325-*a* may be used to activate a mode associated with a service type (e.g., URLLC) and a second MAC CE 325-*n* may be used to deactivate the mode associated with the service type.

Figure 4:
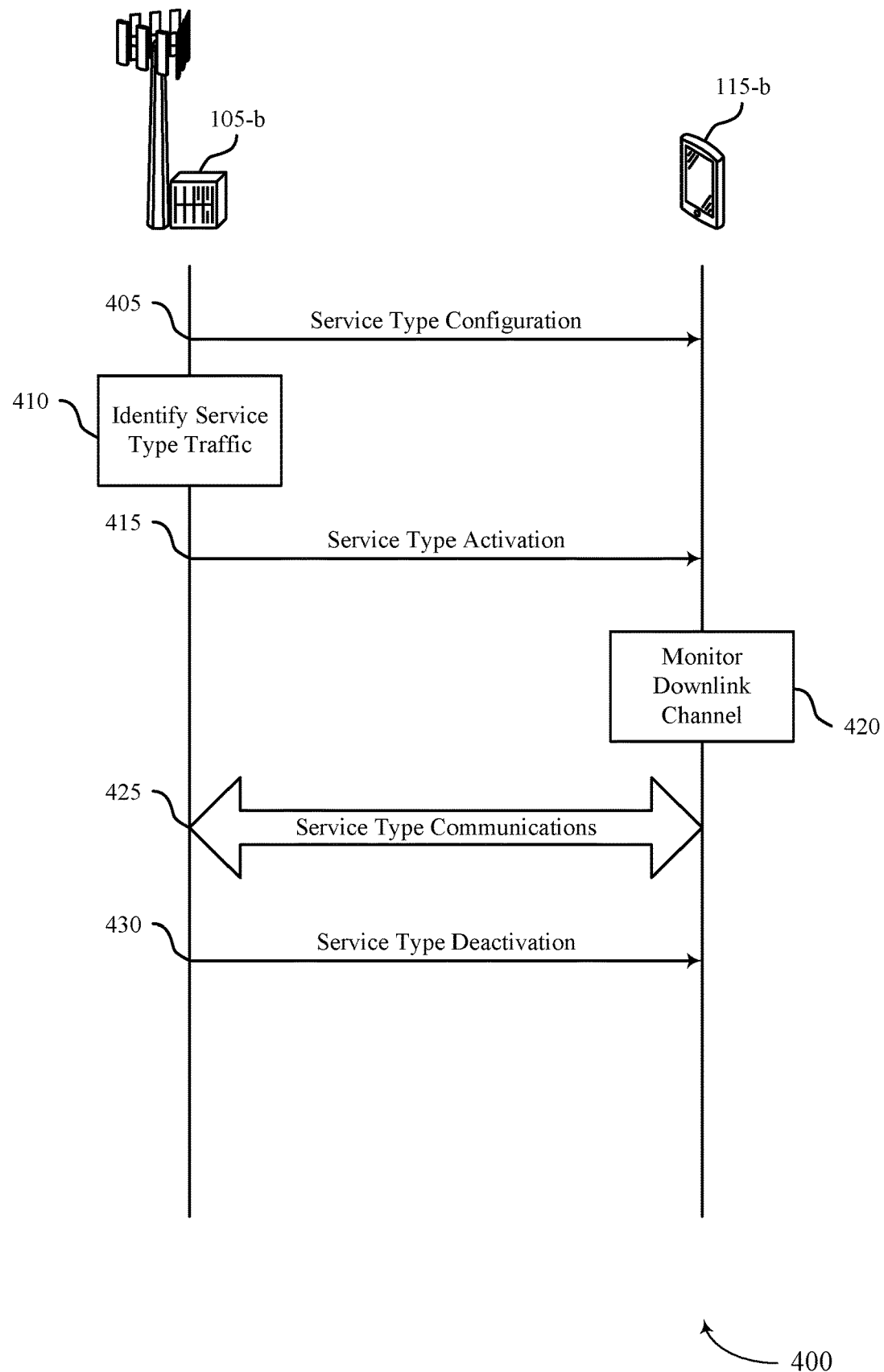
FIGS. 4, 5, and 6 illustrate examples of process flows that support fast activation and deactivation for low latency communications in accordance with aspects of the present disclosure.

FIG. 4 illustrates an example of a process flow 400 that supports fast activation and deactivation for low latency communications in accordance with aspects of the present disclosure. In some examples, process flow 400 may implement aspects of wireless communications systems 100 and/or 200. Process flow 400 may include a base station 105-*b* and a UE 115-*b*, which may be examples of corresponding base stations 105 and UEs 115 as described above with reference to FIGS. 1-3.

In the following description of the process flow 400, the operations between UE 115-*b* and base station 105-*b* may be performed in different orders or at different times. Certain operations may also be left out of the process flow 400, or other operations may be added to the process flow 400. It is to be understood that while UE 115-*b* and base station 105-*b* are shown performing a number of the operations of process flow 400, any wireless device may perform the operations shown.

At 405, base station 105-*b* may transmit, to UE 115-*b*, a configuration for a service type, where the service type may include URLLC or a similar low latency service. In some cases, the configuration may include parameters for a PDCCH, a PDSCH, a PUCCH, a PUSCH, SPS, an SR, or a combination thereof for the service type. Additionally, the configuration may be received via RRC signaling.

At 410, base station 105-*b* may identify traffic associated with the service type.

At 415, base station 105-*b* may transmit, to UE 115-*b*, an activation indicator indicating that UE 115-*b* is to begin monitoring for the service type. Additionally, UE 115-*b* may receive additional information to update the configuration for the service type. In some cases, the activation indicator may be transmitted and received via a MAC CE that activates a mode for the service type. Accordingly, the MAC CE may include a sub-header and an associated content field that includes the activation indicator corresponding to the service type, where the associated content field includes additional information for the service type, a number of activated DRBs, or a combination thereof. Alternatively, the MAC CE may include a sub-header corresponding to the service type without an associated content field, where the sub-header is the activation indicator which triggers a state change from a service type inactive mode to a service type active mode.

Additionally or alternatively, the activation indicator may be transmitted and received via L1 signaling that activates the mode for the service type. For example, UE 115-*b* may receive a DCI message that includes a service type DCI format with the activation indicator (e.g., DCI format for activation/deactivation of the service type mode) or a DCI message that includes a combination of fields that is jointly interpreted as the activation indicator (e.g., existing DCI format). In some cases, UE 115-*b* may monitor a DCI message based on a configured periodicity that is greater than a periodicity for monitoring the downlink channel associated with the service type. Additionally, in such cases, the DCI message may be scrambled by an RNTI associated with the service type, and UE 115-*b* may monitor the DCI message using the RNTI associated with the service type.

At 420, UE 115-*b* may monitor a downlink control channel associated with the service type based on the configuration for the service type and receipt of the activation indicator. Additionally or alternatively, base station 105-*b* may transmit an SPS configuration for uplink and downlink communications associated with the service type. As such, UE 115-*b* may receive, from base station 105-*b*, an SPS activation indicator indicating that UE 115-*b* is to begin monitoring in accordance with the SPS configuration, where monitoring the downlink channel associated with the service type is based on receipt of both the activation indicator and the SPS activation indicator.

At 425, UE 115-*b* and base station 105-*b* may communicate according to the service type based on the activation indicator transmitted and received at 415. For example, base station 105-*b* may transmit, to UE 115-*b*, a downlink message associated with the service type in accordance with the configuration for the service type.

At 430, base station 105-*b* may transmit, to UE 115-*b*, a deactivation indicator indicating that the UE is to stop monitoring for the service type. In some cases, the deactivation indicator may be transmitted in a MAC CE deactivating the service type mode, where the MAC CE includes a sub-header and an associated content field that includes the deactivation indicator corresponding to service type. Alternatively, the MAC CE may include a sub-header corresponding to service type without an associated content field, the sub-header being the deactivation indicator which triggers a state change from a service type active mode to a service type inactive mode. Additionally or alternatively, the deactivation indicator may be transmitted in a DCI message that includes a service type DCI format with the deactivation indicator or in a DCI message that includes a combination of fields that is jointly interpreted as the deactivation indicator.

Figure 5:
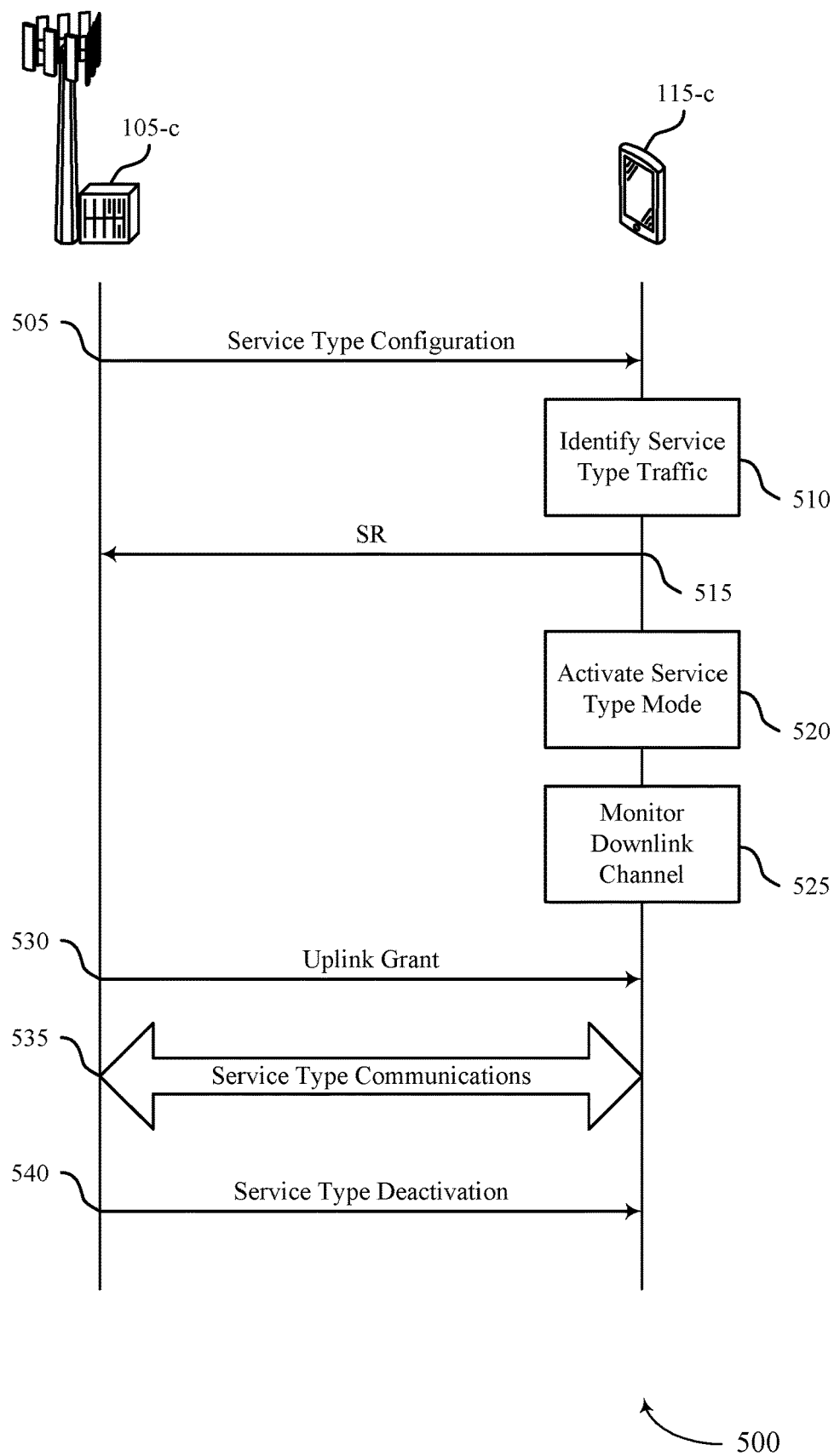

FIG. 5 illustrates an example of a process flow 500 that supports fast activation and deactivation for low latency communications in accordance with aspects of the present disclosure. In some examples, process flow 500 may implement aspects of wireless communications systems 100 and/or 200. Process flow 500 may include a base station 105-*c* and a UE 115-*c*, which may be examples of corresponding base stations 105 and UEs 115 as described above with reference to FIGS. 1-4.

In the following description of the process flow 500, the operations between UE 115-*c* and base station 105-*c* may be performed in different orders or at different times. Certain operations may also be left out of the process flow 500, or other operations may be added to the process flow 500. It is to be understood that while UE 115-*c* and base station 105-*c* are shown performing a number of the operations of process flow 500, any wireless device may perform the operations shown.

At 505, base station 105-*c* may transmit, to UE 115-*c*, a configuration for a service type, where the service type may include URLLC or a similar low latency service. In some cases, the configuration may include parameters for a PDCCH, a PDSCH, a PUCCH, a PUSCH, SPS, an SR, or a combination thereof for the service type. Additionally, the configuration may be received via RRC signaling.

At 510, UE 115-*c* may identify uplink traffic associated with the service type. Accordingly, at 515, UE 115-*c* may transmit, to base station 105-*c*, an SR based on identifying the uplink traffic associated with the service type. Additionally, UE 115-*c* may utilize resources associated with the service type to transmit the SR. In some cases, the UE 115-*c* may transmit a SR that is associated with the service type. For example, the UE 115-*c* may be configured with URLLC SR and eMBB SR. When the UE 115-*a* identifies the uplink traffic associated with URLLC, it will transmit an URLLC SR. The base station 105-*c* or UE 115-*c* may activate the URLLC communication based on UE 115-*c* transmitting URLLC SR. The SR may be transmitted on a PUCCH resource associated with a URLLC service, a PRACH resource associated with the URLLC service, or a combination thereof.

At 520, UE 115-*c* may activate a service type mode for monitoring for a grant for the service type based on transmission of the SR. In some cases, UE 115-*c* may activate a PDCCH configuration associated with the service type based on transmitting the SR. The PDCCH configuration may include at least one of a CORESET configuration and a search space configuration.

At 525, UE 115-*c* may monitor a downlink channel based on the configuration for monitoring the service type. In some cases, UE 115-*c* may monitor the downlink channel based on the PDCCH configuration.

At 530, base station 105-*c* may transmit, to UE 115-*c*, an uplink grant for the identified uplink traffic via the downlink channel. In some cases, the uplink grant may be transmitted and received via a DCI message that includes a service type DCI format. Additionally or alternatively, the uplink grant may be transmitted and received via a DCI message that is scrambled by an RNTI associated with the service type, or a combination thereof.

At 535, base station 105-*c* and UE 115-*c* may communicate according to the service type. For example, UE 115-*c* may transmit, to base station 105-*c*, the uplink traffic associated with the service type based on receiving the uplink grant.

At 540, UE 115-*c* may receive, from base station 105-*c*, a deactivation indicator indicating that UE 115-*c* is to stop the service type mode. In some cases, the deactivation indicator may be received via a MAC CE or a DCI message that includes a service type DCI format that indicates a stop to the service type mode. Accordingly, UE 115-*c* may deactivate the service type mode based on receiving the deactivation indicator.

Figure 6:
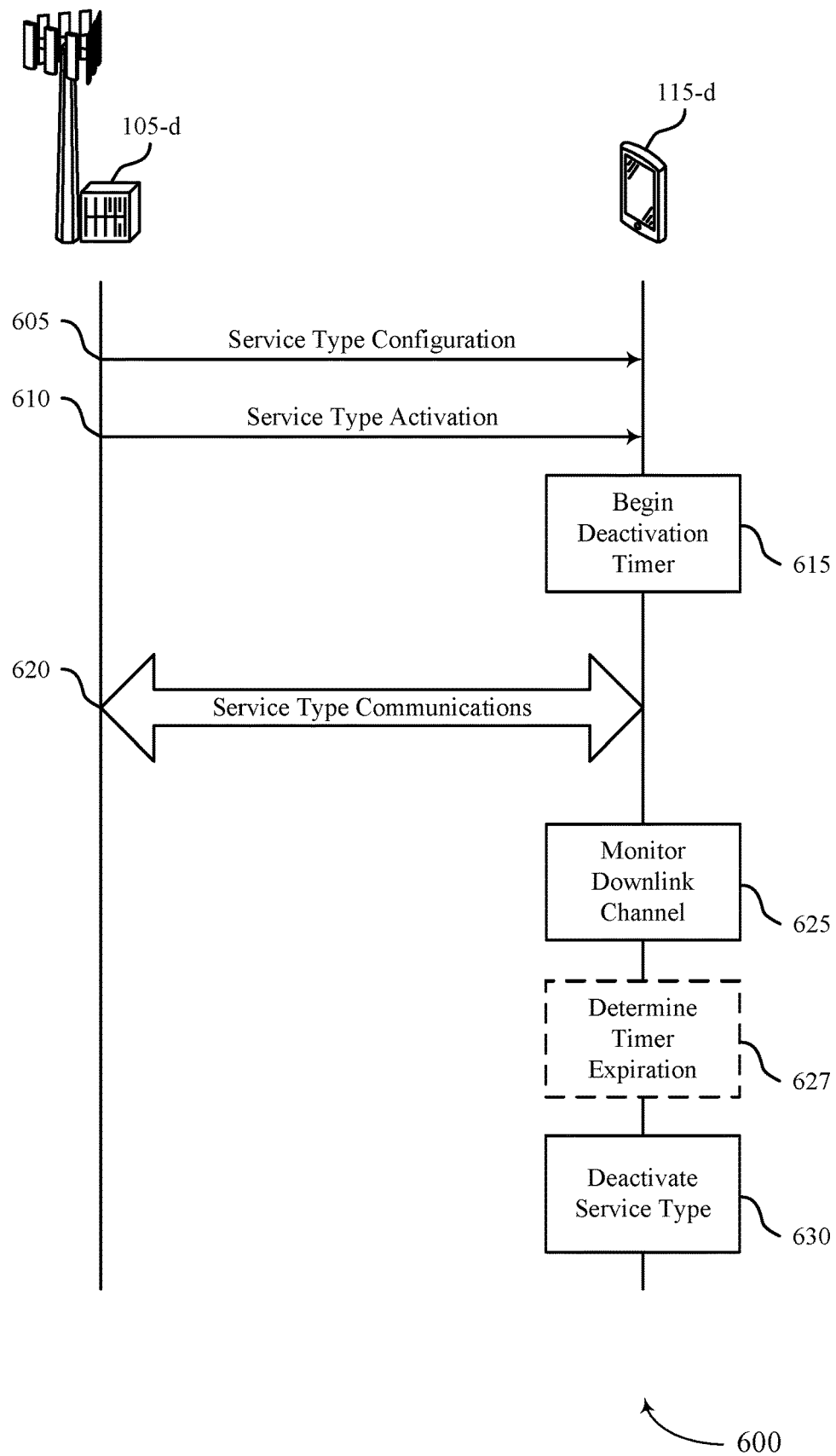

FIG. 6 illustrates an example of a process flow 600 that supports fast activation and deactivation for low latency communications in accordance with aspects of the present disclosure. In some examples, process flow 600 may implement aspects of wireless communications systems 100 and/or 200. Process flow 600 may include a base station 105-*d* and a UE 115-*d*, which may be examples of corresponding base stations 105 and UEs 115 as described above with reference to FIGS. 1-5. Additionally or alternatively, process flow 600 illustrates examples of the UE 115-*d* deactivating a service type (e.g., URLLC) using a timer-based approach. For example, the base station 105-*d* may not explicitly indicate deactivation of the service type. Instead, the UE 115-*d* may determine to deactivate the service type based on the timer value, or other condition being satisfied.

In the following description of the process flow 600, the operations between UE 115-*d* and base station 105-*d* may be performed in different orders or at different times. Certain operations may also be left out of the process flow 600, or other operations may be added to the process flow 600. It is to be understood that while UE 115-*d* and base station 105-*d* are shown performing a number of the operations of process flow 600, any wireless device may perform the operations shown.

At 605, base station 105-*d* may transmit, to UE 115-*d*, a configuration for a service type, where the service type may include a URLLC service or a similar low latency service. In some cases, the configuration may include parameters for a PDCCH, a PDSCH, a PUCCH, a PUSCH, SPS, an SR, or a combination thereof for the service type. Additionally, the configuration may be received via RRC signaling. In some cases, UE 115-*d* may further receive an initial value for a deactivation timer associated with the service type.

At 610, base station 105-*d* may transmit, to UE 115-*d*, an activation indicator indicating that UE 115-*d* is to activate a mode for the service type.

At 615, UE 115-*d* may initiate the deactivation timer based on receiving the activation indicator. As such, at 620, UE 115-*d* and base station 105-*d* may communicate according to the service type. Additionally, at 625, UE 115-*d* may monitor a downlink control channel associated with the service type based on the configuration for the service type and receipt of the activation indicator.

At 627, the UE 115-*d* may determine that a condition is satisfied, for example, that a timer associated with the service type has expired. In response, the UE 115-*d* may determine that a condition for deactivation of the service type are met and perform one or more processes in response, such as deactivation.

At 630, UE 115-*d* may deactivate the service type based on the deactivation timer expiring, not expecting a downlink HARQ retransmission, no data in a HARQ buffer for an uplink retransmission, no uplink data for the service type, or a combination thereof. In some cases, UE 115-*d* may adjust the deactivation timer based on not receiving a service type communication associated with the service type within a scheduling occasion for the service type communication.

Figure 7:
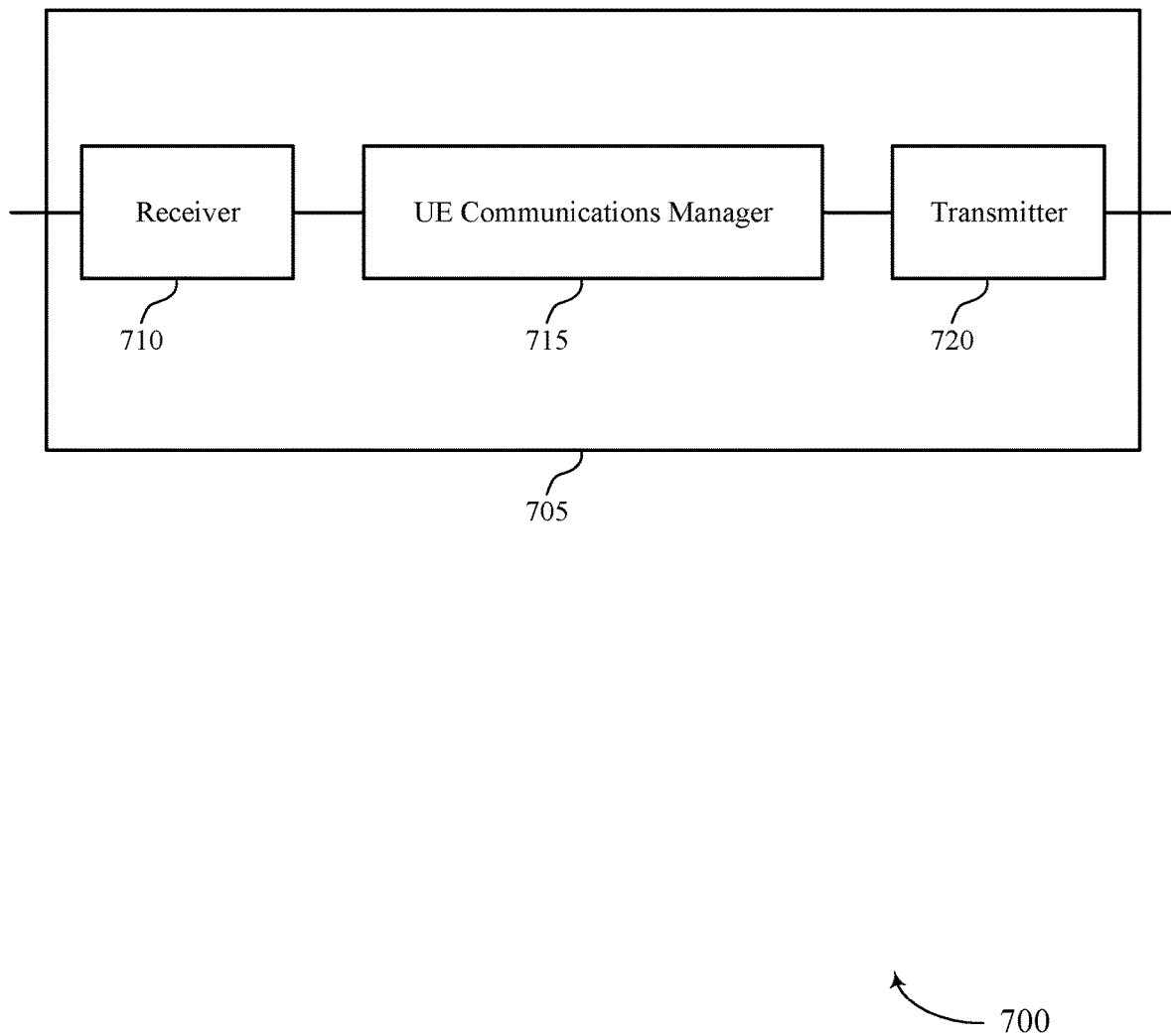
FIGS. 7 and 8 show block diagrams of devices that support fast activation and deactivation for low latency communications in accordance with aspects of the present disclosure.

FIG. 7 shows a block diagram 700 of a device 705 that supports fast activation and deactivation for low latency communications in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to fast activation and deactivation for low latency communications, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may receive, from a base station, a configuration for a service type. In some cases, UE communications manager 715 may receive, from the base station, an activation indicator indicating that the UE is to begin monitoring for the service type. Accordingly, UE communications manager 715 may monitor a downlink control channel associated with the service type based on the configuration for the service type and receipt of the activation indicator. Additionally, UE communications manager 715 may receive a downlink message associated with the service type in accordance with the configuration for the service type.

Additionally or alternatively, the UE communications manager 715 may also receive, from a base station, a configuration for a service type and then identify uplink traffic associated with the service type. Accordingly, UE communications manager 715 may transmit, to the base station, an SR based on identifying the uplink traffic associated with the service type and activate a service type mode for monitoring for a grant for the service type based on transmission of the SR. UE communications manager 715 may then monitor a downlink channel based on the configuration for monitoring the service type. In some cases, UE communications manager 715 may receive, from the base station, an uplink grant for the identified uplink traffic via the downlink channel. Subsequently, UE communications manager 715 may transmit, to the base station, the uplink traffic associated with the service type based on receiving the uplink grant. The UE communications manager 715 may be an example of aspects of the UE communications manager 1010 described herein.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
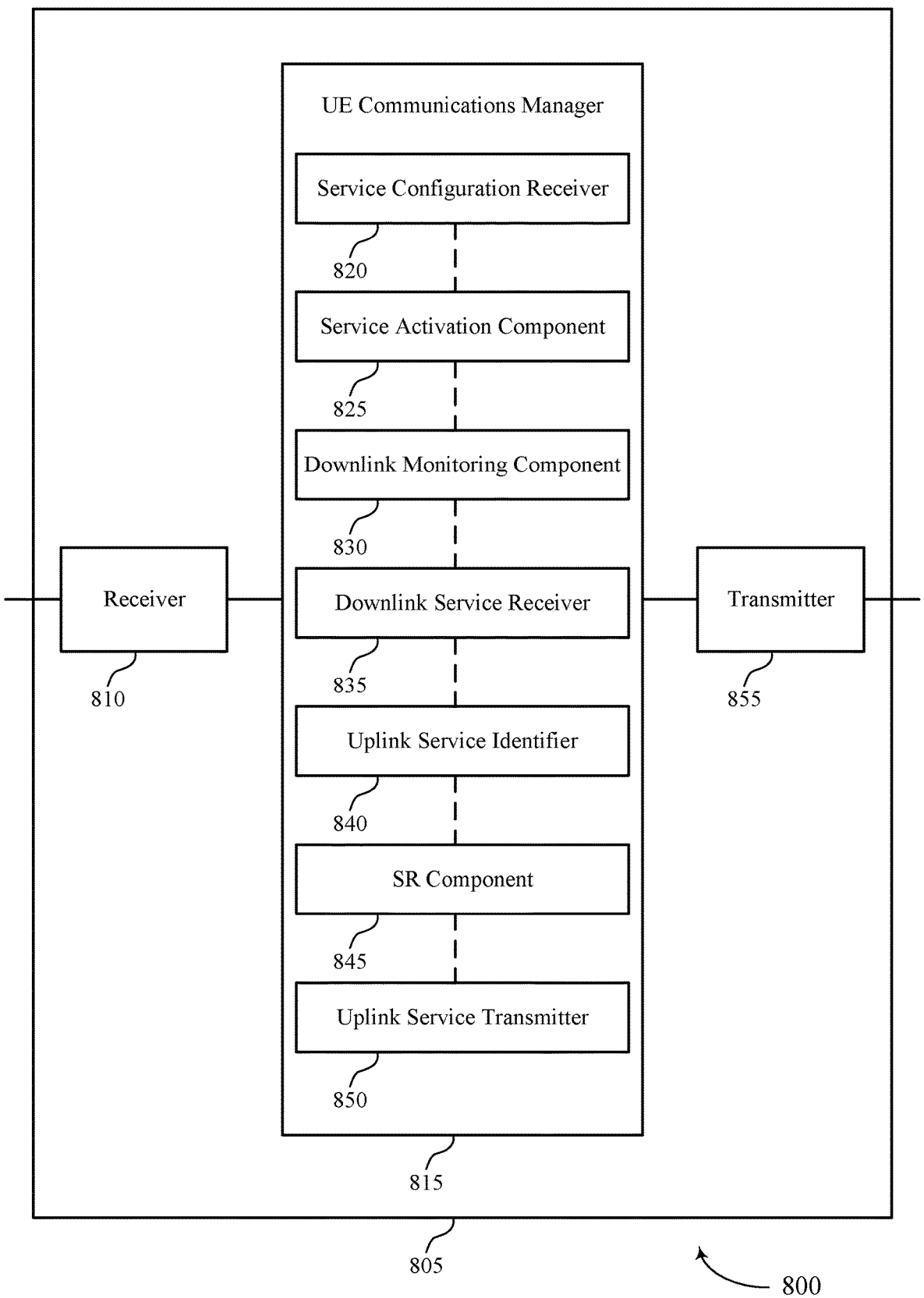

FIG. 8 shows a block diagram 800 of a device 805 that supports fast activation and deactivation for low latency communications in accordance with aspects of the present disclosure. The device 805 may be an example of aspects of a device 705 or a UE 115 as described herein. The device 805 may include a receiver 810, a UE communications manager 815, and a transmitter 855. The device 805 may also include a processor. Each of these components may be in communication with one another (e.g., via one or more buses).

The receiver 810 may receive information such as packets, user data, or control information associated with various information channels (e.g., control channels, data channels, and information related to fast activation and deactivation for low latency communications, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a service configuration receiver 820, a service activation component 825, a downlink monitoring component 830, a downlink service receiver 835, an uplink service identifier 840, an SR component 845, and an uplink service transmitter 850. The UE communications manager 815 may be an example of aspects of the UE communications manager 1010 described herein.

The service configuration receiver 820 may receive, from a base station, a configuration for a service type. The service activation component 825 may receive, from the base station, an activation indicator indicating that the UE is to begin monitoring for the service type.

The downlink monitoring component 830 may monitor a downlink control channel associated with the service type based on the configuration for the service type and receipt of the activation indicator. The downlink service receiver 835 may receive a downlink message associated with the service type in accordance with the configuration for the service type.

The uplink service identifier 840 may identify uplink traffic associated with the service type.

The SR component 845 may transmit, to the base station, an SR based on identifying the uplink traffic associated with the service type. In some cases, the service activation component 825 may activate a service type mode for monitoring for a grant for the service type based on transmission of an SR. Additionally, the downlink monitoring component 830 may monitor a downlink channel based on the configuration for monitoring the service type.

In some cases, the downlink service receiver 835 may receive, from the base station, an uplink grant for the identified uplink traffic via the downlink channel. Accordingly, the uplink service transmitter 850 may transmit, to the base station, the uplink traffic associated with the service type based on receiving the uplink grant.

The transmitter 855 may transmit signals generated by other components of the device 805. In some examples, the transmitter 855 may be collocated with a receiver 810 in a transceiver module. For example, the transmitter 855 may be an example of aspects of the transceiver 1020 described with reference to FIG. 10. The transmitter 855 may utilize a single antenna or a set of antennas.

Figure 9:
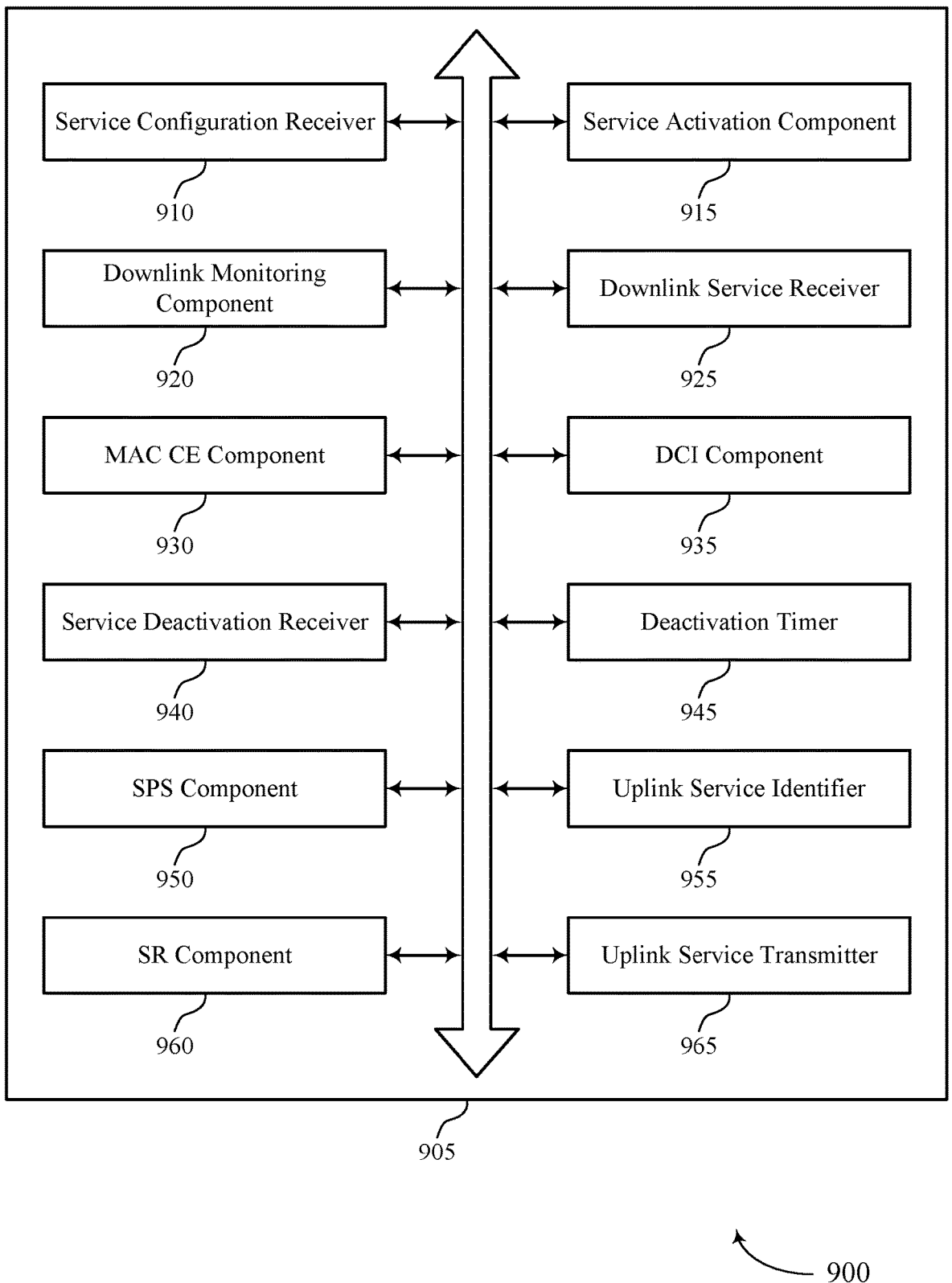
FIG. 9 shows a block diagram of a UE communications manager that supports fast activation and deactivation for low latency communications in accordance with aspects of the present disclosure.

FIG. 9 shows a block diagram 900 of a UE communications manager 905 that supports fast activation and deactivation for low latency communications in accordance with aspects of the present disclosure. The UE communications manager 905 may be an example of aspects of a UE communications manager 715, a UE communications manager 815, or a UE communications manager 1010 described herein. The UE communications manager 905 may include a service configuration receiver 910, a service activation component 915, a downlink monitoring component 920, a downlink service receiver 925, a MAC CE component 930, a DCI component 935, a service deactivation receiver 940, a deactivation timer 945, a SPS component 950, an uplink service identifier 955, an SR component 960, and an uplink service transmitter 965. Each of these modules may communicate, directly or indirectly, with one another (e.g., via one or more buses).

The service configuration receiver 910 may receive, from a base station, a configuration for a service type. In some cases, the configuration for the service type includes parameters for a PDCCH, a PDSCH, a PUCCH, a PUSCH, SPS, an SR, or a combination thereof for the service type. In some cases, the configuration for the service type is received via RRC signaling. In some cases, the service type includes a URLLC service or a low latency service.

The service activation component 915 may receive, from the base station, an activation indicator indicating that the UE is to begin monitoring for the service type. In some examples, the service activation component 915 may activate a service type mode for monitoring for a grant for the service type based on transmission of the SR. In some examples, the service activation component 915 may receive additional information to update the configuration for the service type.

The downlink monitoring component 920 may monitor a downlink control channel associated with the service type based on the configuration for the service type and receipt of the activation indicator. In some examples, the downlink monitoring component 920 may monitor a downlink channel based on the configuration for monitoring the service type. In some examples, the downlink monitoring component 920 may activate a PDCCH configuration associated with the service type based on transmitting the SR. Accordingly, the downlink monitoring component 920 may monitor the downlink channel based on the PDCCH configuration. In some cases, the PDCCH configuration includes at least a control resource set configuration and a search space configuration.

The downlink service receiver 925 may receive a downlink message associated with the service type in accordance with the configuration for the service type. In some examples, the downlink service receiver 925 may receive, from the base station, an uplink grant for the identified uplink traffic via the downlink channel. In some examples, the downlink service receiver 925 may receive the uplink grant via a DCI message that includes a service type DCI format, that is scrambled by an RNTI associated with the service type, or a combination thereof.

The uplink service identifier 955 may identify uplink traffic associated with the service type.

The SR component 960 may transmit, to the base station, an SR based on identifying the uplink traffic associated with the service type.

The uplink service transmitter 965 may transmit, to the base station, the uplink traffic associated with the service type based on receiving the uplink grant.

The MAC CE component 930 may receive, from the base station, a MAC CE activating a service type mode. In some examples, the MAC CE component 930 may receive the MAC CE that includes a sub-header and an associated content field that includes the activation indicator corresponding to the service type. In some examples, the MAC CE component 930 may receive the MAC CE that includes a sub-header corresponding to the service type without an associated content field, where the sub-header is the activation indicator which triggers a state change from a service type inactive mode to a service type active mode. In some cases, the associated content field includes additional information for the service type, a number of activated data radio bearers, or a combination thereof.

The DCI component 935 may receive, from the base station, layer one signaling activating a service type mode. In some examples, the DCI component 935 may receive a DCI message that includes a service type DCI format with the activation indicator. In some examples, the DCI component 935 may receive a DCI message that includes a combination of fields that is jointly interpreted as the activation indicator. In some examples, the DCI component 935 may monitor a DCI message based on a configured periodicity that is greater than a periodicity for monitoring the downlink channel associated with the service type. In some examples, the DCI component 935 may monitor the DCI message using the RNTI associated with the service type. In some cases, the DCI message is scrambled by an RNTI associated with the service type.

The service deactivation receiver 940 may receive, from the base station, a deactivation indicator indicating that the UE is to stop monitoring for the service type. In some examples, the service deactivation receiver 940 may receive a MAC CE deactivating a service type mode, where the MAC CE includes a sub-header and an associated content field that includes the deactivation indicator corresponding to service type. In some examples, the service deactivation receiver 940 may receive a MAC CE deactivating a service type mode, where the MAC CE includes a sub-header corresponding to service type without an associated content field, the sub-header being the deactivation indicator which triggers a state change from a service type active mode to a service type inactive mode.

In some examples, the service deactivation receiver 940 may receive a DCI message that includes a service type DCI format with the deactivation indicator. In some examples, the service deactivation receiver 940 may receive a DCI message that includes a combination of fields that is jointly interpreted as the deactivation indicator.

In some examples, the service deactivation receiver 940 may receive, from the base station, a deactivation indicator indicating that the UE is to stop the service type mode. In some examples, the service deactivation receiver 940 may deactivate the service type mode based on receiving the deactivation indicator. In some examples, the service deactivation receiver 940 may receive a MAC CE or a DCI message that includes a service type DCI format that indicates a stop to the service type mode.

The deactivation timer 945 may receive a value for a deactivation timer associated with the service type. In some examples, the deactivation timer 945 may initiate the deactivation timer based on receiving the activation indicator. In some examples, the deactivation timer 945 may deactivate the service type based on the deactivation timer expiring, not expecting a downlink HARQ retransmission, no data in a HARQ buffer for an uplink retransmission, no uplink data for the service type, or a combination thereof. In some examples, the deactivation timer 945 may adjust the deactivation timer based on not receiving a service type communication associated with the service type within a scheduling occasion for the service type communication.

The SPS component 950 may receive an SPS configuration for uplink and downlink communications associated with the service type. In some examples, the SPS component 950 may receive an SPS activation indicator indicating that the UE is to begin monitoring in accordance with the SPS configuration, where monitoring the downlink channel associated with the service type is based on receipt of both the activation indicator and the SPS activation indicator.

Figure 10:
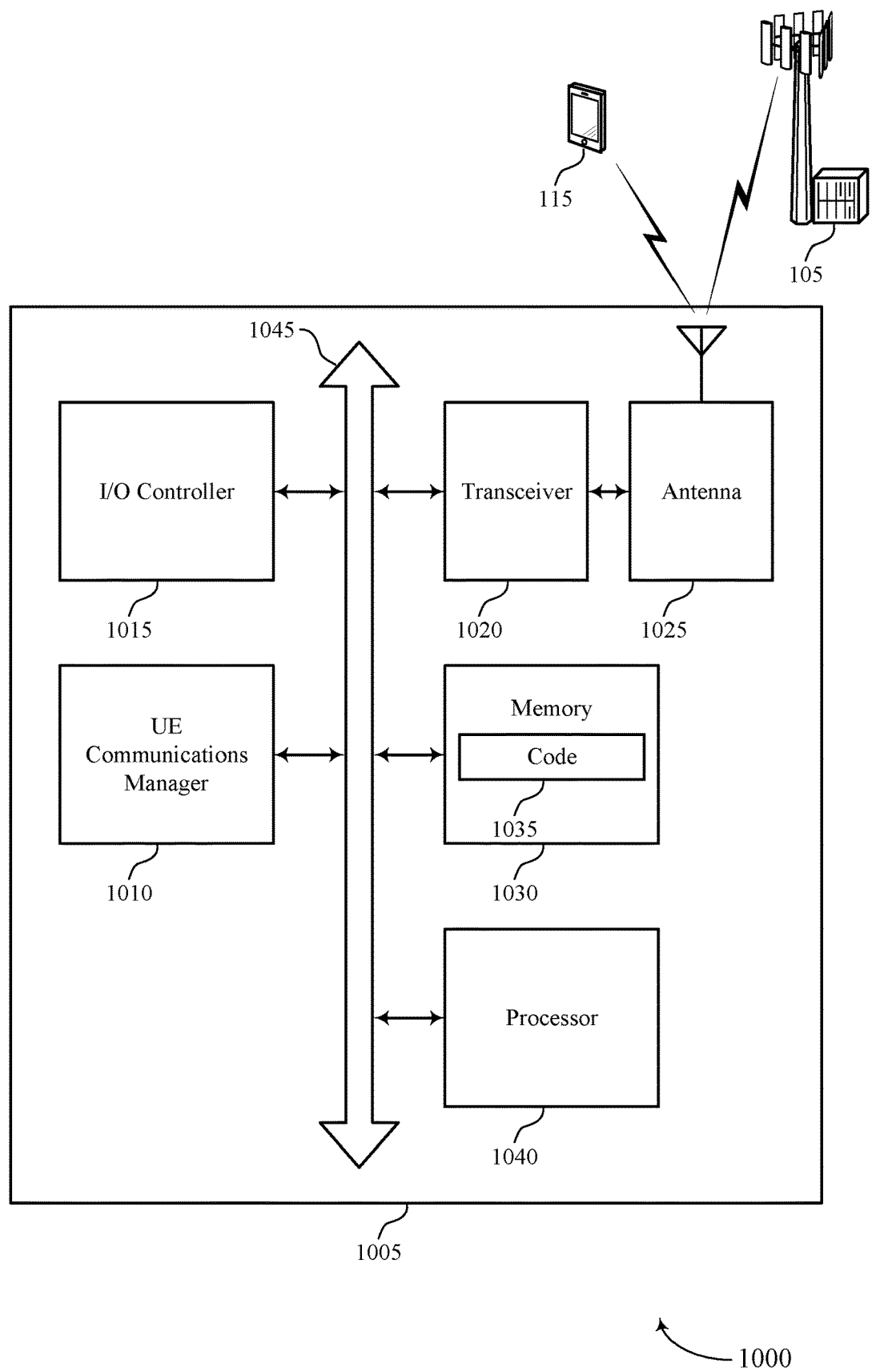
FIG. 10 shows a diagram of a system including a device that supports fast activation and deactivation for low latency communications in accordance with aspects of the present disclosure.

FIG. 10 shows a diagram of a system 1000 including a device 1005 that supports fast activation and deactivation for low latency communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be coupled via one or more buses (e.g., bus 1045).

The UE communications manager 1010 may receive, from a base station, a configuration for a service type. In some cases, UE communications manager 1010 may receive, from the base station, an activation indicator indicating that the UE is to begin monitoring for the service type. Accordingly, UE communications manager 1010 may monitor a downlink control channel associated with the service type based on the configuration for the service type and receipt of the activation indicator. Additionally, UE communications manager 1010 may receive a downlink message associated with the service type in accordance with the configuration for the service type.

Additionally or alternatively, the UE communications manager 1010 may also receive, from a base station, a configuration for a service type and then identify uplink traffic associated with the service type. Accordingly, UE communications manager 1010 may transmit, to the base station, an SR based on identifying the uplink traffic associated with the service type and activate a service type mode for monitoring for a grant for the service type based on transmission of the SR. UE communications manager 1010 may then monitor a downlink channel based on the configuration for monitoring the service type. In some cases, UE communications manager 1010 may receive, from the base station, an uplink grant for the identified uplink traffic via the downlink channel. Subsequently, UE communications manager 1010 may transmit, to the base station, the uplink traffic associated with the service type based on receiving the uplink grant.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting fast activation and deactivation for low latency communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
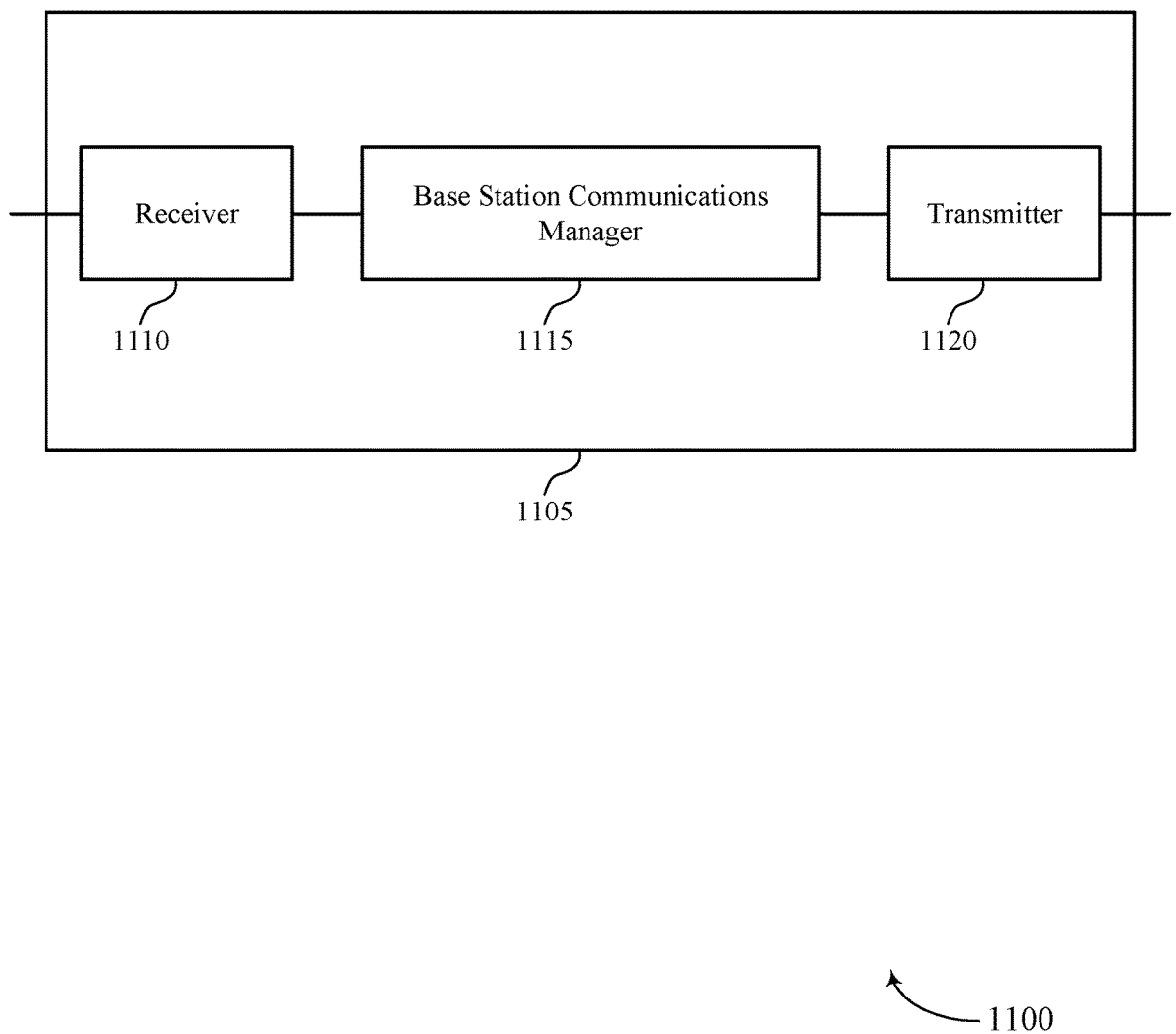
FIGS. 11 and 12 show block diagrams of devices that support fast activation and deactivation for low latency communications in accordance with aspects of the present disclosure.

FIG. 11 shows a block diagram 1100 of a device 1105 that supports fast activation and deactivation for low latency communications in accordance with aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to fast activation and deactivation for low latency communications, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may transmit, to a UE, a configuration for a service type. In some cases, base station communications manager 1115 may identify traffic associated with the service type and transmit, to the UE, an activation indicator indicating that the UE is to begin monitoring for the service type based on the identifying the traffic associated with the service type. Subsequently, base station communications manager 1115 may transmit a downlink message associated with the service type in accordance with the configuration for the service type.

Additionally or alternatively, the base station communications manager 1115 may also transmit, to a UE, a configuration for a service type. In some cases, base station communications manager 1115 may then receive, from the UE, an SR for uplink traffic associated with the service type. Accordingly, base station communications manager 1115 may transmit, to the UE, an uplink grant for the uplink traffic indicated in the SR. Base station communications manager 1115 may then receive the uplink traffic associated with the service type based on transmitting the uplink grant. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
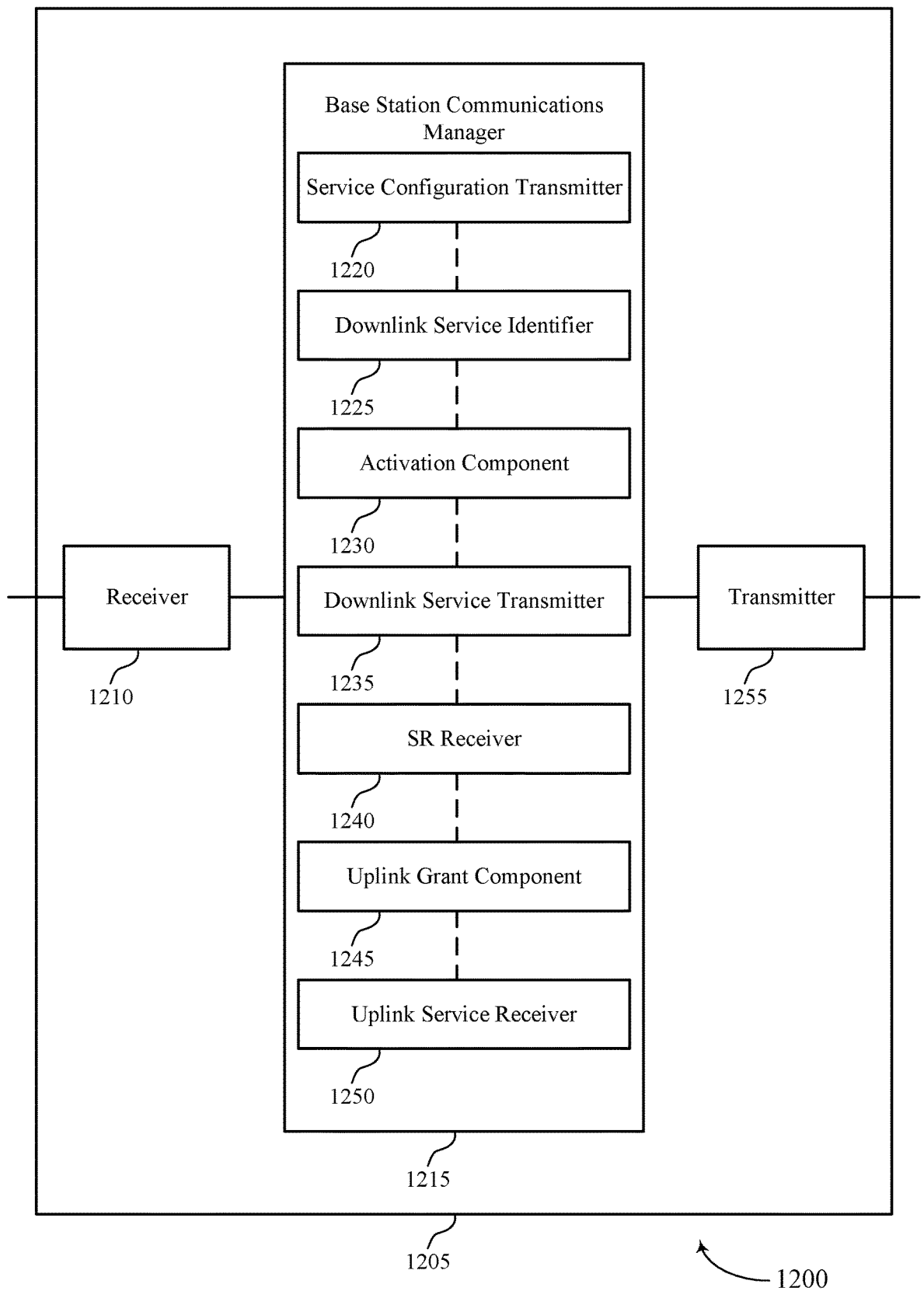

FIG. 12 shows a block diagram 1200 of a device 1205 that supports fast activation and deactivation for low latency communications in accordance with aspects of the present disclosure. The device 1205 may be an example of aspects of a device 1105 or a base station 105 as described herein. The device 1205 may include a receiver 1210, a base station communications manager 1215, and a transmitter 1255. The device 1205 may also include a processor. Each of these components may be in communication with one another (e.g., via one or more buses).

The receiver 1210 may receive information such as packets, user data, or control information associated with various information channels (e.g., control channels, data channels, and information related to fast activation and deactivation for low latency communications, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a service configuration transmitter 1220, a downlink service identifier 1225, an activation component 1230, a downlink service transmitter 1235, an SR receiver 1240, an uplink grant component 1245, and an uplink service receiver 1250. The base station communications manager 1215 may be an example of aspects of the base station communications manager 1410 described herein.

The service configuration transmitter 1220 may transmit, to a UE, a configuration for a service type.

The downlink service identifier 1225 may identify traffic associated with the service type.

The activation component 1230 may transmit, to the UE, an activation indicator indicating that the UE is to begin monitoring for the service type based on the identifying the traffic associated with the service type.

The downlink service transmitter 1235 may transmit a downlink message associated with the service type in accordance with the configuration for the service type.

The SR receiver 1240 may receive, from the UE, an SR for uplink traffic associated with the service type.

The uplink grant component 1245 may transmit, to the UE, an uplink grant for the uplink traffic indicated in the SR.

The uplink service receiver 1250 may receive the uplink traffic associated with the service type based on transmitting the uplink grant.

The transmitter 1255 may transmit signals generated by other components of the device 1205. In some examples, the transmitter 1255 may be collocated with a receiver 1210 in a transceiver module. For example, the transmitter 1255 may be an example of aspects of the transceiver 1420 described with reference to FIG. 14. The transmitter 1255 may utilize a single antenna or a set of antennas.

Figure 13:
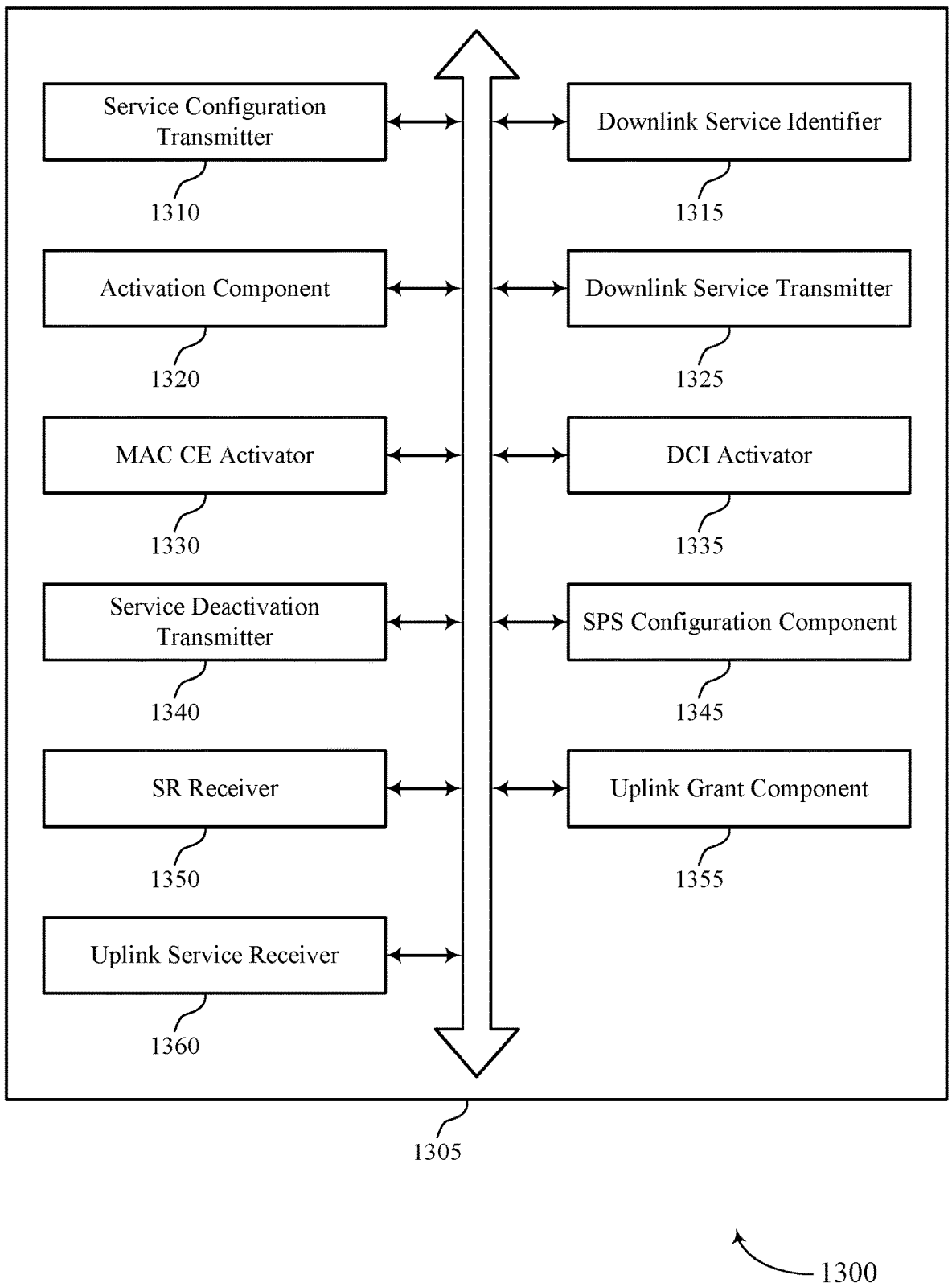
FIG. 13 shows a block diagram of a base station communications manager that supports fast activation and deactivation for low latency communications in accordance with aspects of the present disclosure.

FIG. 13 shows a block diagram 1300 of a base station communications manager 1305 that supports fast activation and deactivation for low latency communications in accordance with aspects of the present disclosure. The base station communications manager 1305 may be an example of aspects of a base station communications manager 1115, a base station communications manager 1215, or a base station communications manager 1410 described herein. The base station communications manager 1305 may include a service configuration transmitter 1310, a downlink service identifier 1315, an activation component 1320, a downlink service transmitter 1325, a MAC CE activator 1330, a DCI activator 1335, a service deactivation transmitter 1340, an SPS configuration component 1345, an SR receiver 1350, an uplink grant component 1355, and an uplink service receiver 1360. Each of these modules may communicate, directly or indirectly, with one another (e.g., via one or more buses).

The service configuration transmitter 1310 may transmit, to a UE, a configuration for a service type. Additionally, in some examples, the service configuration transmitter 1310 may transmit a value for a deactivation timer associated with the service type. In some cases, the configuration for the service type includes parameters for a PDCCH, a PDSCH, a PUCCH, a PUSCH, SPS, an SR, or a combination thereof for the service type. In some cases, the configuration for the service type is transmitted via RRC signaling. In some cases, the service type includes a URLLC service or a low latency service.

The downlink service identifier 1315 may identify traffic associated with the service type.

The activation component 1320 may transmit, to the UE, an activation indicator indicating that the UE is to begin monitoring for the service type based on the identifying the traffic associated with the service type. In some examples, the activation component 1320 may transmit additional information to update the configuration for the service type.

The downlink service transmitter 1325 may transmit a downlink message associated with the service type in accordance with the configuration for the service type.

The SR receiver 1350 may receive, from the UE, an SR for uplink traffic associated with the service type.

The uplink grant component 1355 may transmit, to the UE, an uplink grant for the uplink traffic indicated in the SR. In some examples, the uplink grant component 1355 may transmit the uplink grant via a DCI message that includes a service type DCI format, that is scrambled by an RNTI associated with the service type, or a combination thereof.

The uplink service receiver 1360 may receive the uplink traffic associated with the service type based on transmitting the uplink grant.

The MAC CE activator 1330 may transmit, to the UE, a MAC CE activating a service type mode. In some examples, the MAC CE activator 1330 may transmit the MAC CE that includes a sub-header and an associated content field that includes the activation indicator corresponding to the service type. In some examples, the MAC CE activator 1330 may transmit the MAC CE that includes a sub-header corresponding to the service type without an associated content field, where the sub-header is the activation indicator which triggers a state change from a service type inactive mode to a service type active mode. In some cases, the associated content field includes additional information for the service type, a number of activated data radio bearers, or a combination thereof.

The DCI activator 1335 may transmit, to the UE, layer one signaling activating a service type mode. In some examples, the DCI activator 1335 may transmit a DCI message that includes a service type DCI format with the activation indicator. In some examples, the DCI activator 1335 may transmit a DCI message that includes a combination of fields that is jointly interpreted as the activation indicator.

The service deactivation transmitter 1340 may transmit, to the UE, a deactivation indicator indicating that the UE is to stop monitoring for the service type. In some examples, the service deactivation transmitter 1340 may transmit a MAC CE deactivating a service type mode, where the MAC CE includes a sub-header and an associated content field that includes the deactivation indicator corresponding to service type. In some examples, the service deactivation transmitter 1340 may transmit a MAC CE deactivating a service type mode, where the MAC CE includes a sub-header corresponding to service type without an associated content field, the sub-header being the deactivation indicator which triggers a state change from a service type active mode to a service type inactive mode.

In some examples, the service deactivation transmitter 1340 may transmit a DCI message that includes a service type DCI format with the deactivation indicator. In some examples, the service deactivation transmitter 1340 may transmit a DCI message that includes a combination of fields that is jointly interpreted as the deactivation indicator.

In some examples, the service deactivation transmitter 1340 may transmit, to the UE, a deactivation indicator indicating that the UE is to stop the service type mode. In some examples, the service deactivation transmitter 1340 may transmit a MAC CE or a DCI message that includes a service type DCI format that indicates a stop to the service type mode.

The SPS configuration component 1345 may transmit a SPS configuration for uplink and downlink communications associated with the service type. In some examples, the SPS configuration component 1345 may transmit an SPS activation indicator indicating that the UE is to begin monitoring in accordance with the SPS configuration.

Figure 14:
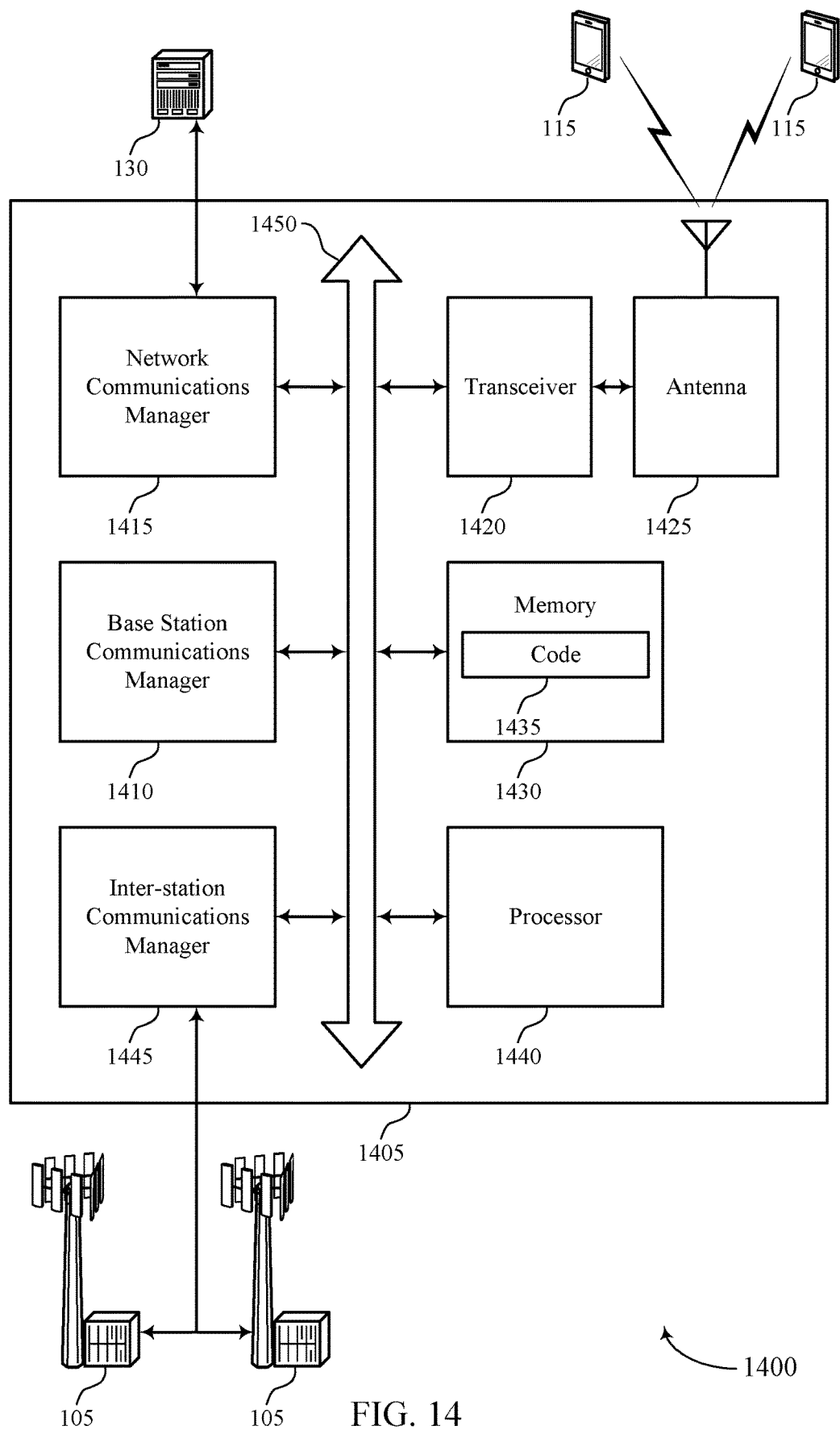
FIG. 14 shows a diagram of a system including a device that supports fast activation and deactivation for low latency communications in accordance with aspects of the present disclosure.

FIG. 14 shows a diagram of a system 1400 including a device 1405 that supports fast activation and deactivation for low latency communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be coupled via one or more buses (e.g., bus 1450).

The base station communications manager 1410 may transmit, to a UE, a configuration for a service type. In some cases, base station communications manager 1410 may identify traffic associated with the service type and transmit, to the UE, an activation indicator indicating that the UE is to begin monitoring for the service type based on the identifying the traffic associated with the service type. Subsequently, base station communications manager 1410 may transmit a downlink message associated with the service type in accordance with the configuration for the service type.

Additionally or alternatively, the base station communications manager 1410 may also transmit, to a UE, a configuration for a service type. In some cases, base station communications manager 1410 may then receive, from the UE, an SR for uplink traffic associated with the service type. Accordingly, base station communications manager 1410 may transmit, to the UE, an uplink grant for the uplink traffic indicated in the SR. Base station communications manager 1410 may then receive the uplink traffic associated with the service type based on transmitting the uplink grant.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device #{device} to perform various functions (e.g., functions or tasks supporting fast activation and deactivation for low latency communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
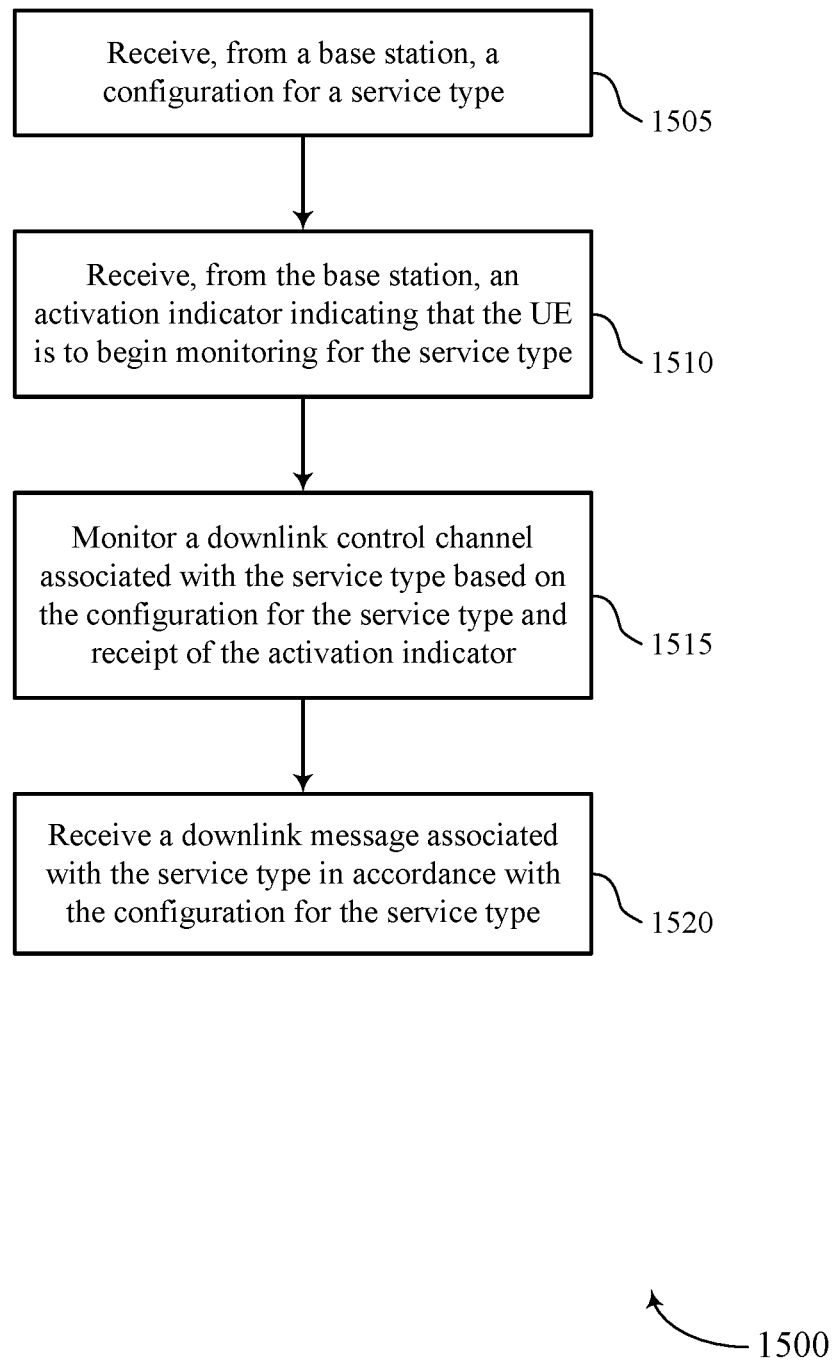
FIGS. 15 through 21 show flowcharts illustrating methods that support fast activation and deactivation for low latency communications in accordance with aspects of the present disclosure.

FIG. 15 shows a flowchart illustrating a method 1500 that supports fast activation and deactivation for low latency communications in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configuration for a service type. The operations of 1505 may be performed according to the methods described herein. In some examples, aspects of the operations of 1505 may be performed by a service configuration receiver as described with reference to FIGS. 7 through 10.

At 1510, the UE may receive, from the base station, an activation indicator indicating that the UE is to begin monitoring for the service type. The operations of 1510 may be performed according to the methods described herein. In some examples, aspects of the operations of 1510 may be performed by a service activation component as described with reference to FIGS. 7 through 10.

At 1515, the UE may monitor a downlink control channel associated with the service type based on the configuration for the service type and receipt of the activation indicator. The operations of 1515 may be performed according to the methods described herein. In some examples, aspects of the operations of 1515 may be performed by a downlink monitoring component as described with reference to FIGS. 7 through 10.

At 1520, the UE may receive a downlink message associated with the service type in accordance with the configuration for the service type. The operations of 1520 may be performed according to the methods described herein. In some examples, aspects of the operations of 1520 may be performed by a downlink service receiver as described with reference to FIGS. 7 through 10.

Figure 16:
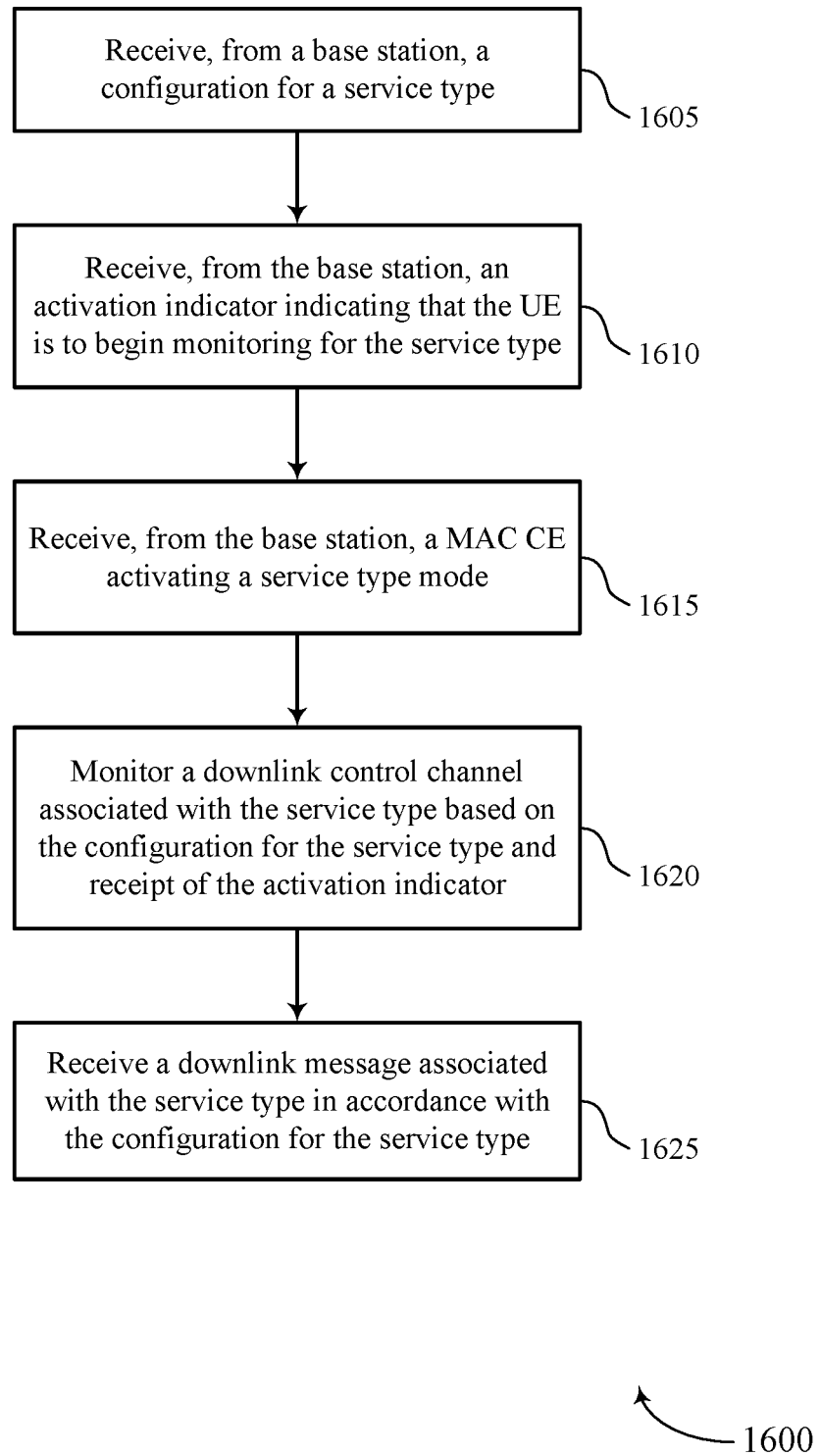

FIG. 16 shows a flowchart illustrating a method 1600 that supports fast activation and deactivation for low latency communications in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a configuration for a service type. The operations of 1605 may be performed according to the methods described herein. In some examples, aspects of the operations of 1605 may be performed by a service configuration receiver as described with reference to FIGS. 7 through 10.

At 1610, the UE may receive, from the base station, an activation indicator indicating that the UE is to begin monitoring for the service type. The operations of 1610 may be performed according to the methods described herein. In some examples, aspects of the operations of 1610 may be performed by a service activation component as described with reference to FIGS. 7 through 10.

At 1615, the UE may receive, from the base station, a MAC CE activating a service type mode. The operations of 1615 may be performed according to the methods described herein. In some examples, aspects of the operations of 1615 may be performed by a MAC CE component as described with reference to FIGS. 7 through 10.

At 1620, the UE may monitor a downlink control channel associated with the service type based on the configuration for the service type and receipt of the activation indicator. The operations of 1620 may be performed according to the methods described herein. In some examples, aspects of the operations of 1620 may be performed by a downlink monitoring component as described with reference to FIGS. 7 through 10.

At 1625, the UE may receive a downlink message associated with the service type in accordance with the configuration for the service type. The operations of 1625 may be performed according to the methods described herein. In some examples, aspects of the operations of 1625 may be performed by a downlink service receiver as described with reference to FIGS. 7 through 10.

Figure 17:
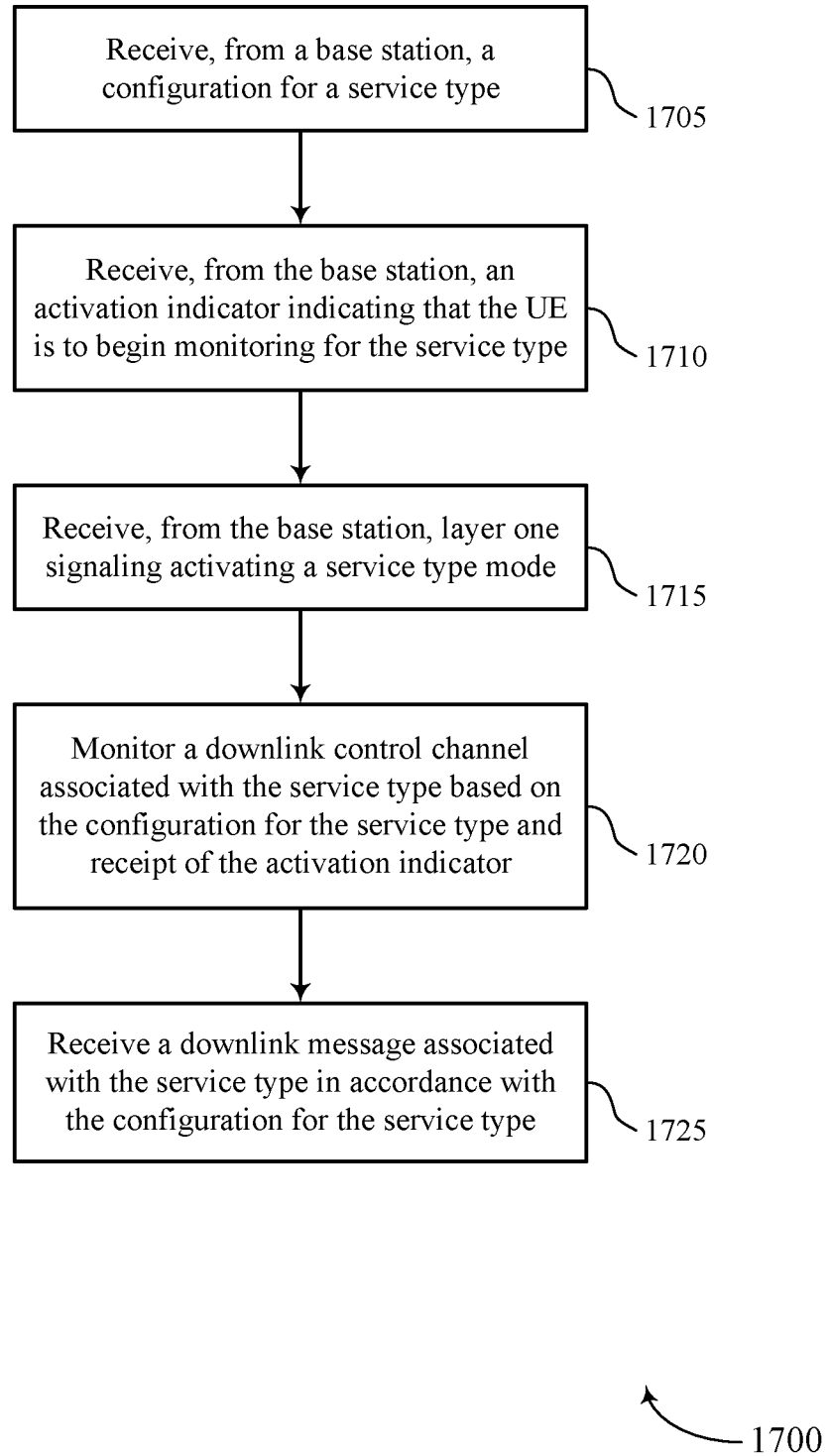

FIG. 17 shows a flowchart illustrating a method 1700 that supports fast activation and deactivation for low latency communications in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a configuration for a service type. The operations of 1705 may be performed according to the methods described herein. In some examples, aspects of the operations of 1705 may be performed by a service configuration receiver as described with reference to FIGS. 7 through 10.

At 1710, the UE may receive, from the base station, an activation indicator indicating that the UE is to begin monitoring for the service type. The operations of 1710 may be performed according to the methods described herein. In some examples, aspects of the operations of 1710 may be performed by a service activation component as described with reference to FIGS. 7 through 10.

At 1715, the UE may receive, from the base station, L1 signaling activating a service type mode. The operations of 1715 may be performed according to the methods described herein. In some examples, aspects of the operations of 1715 may be performed by a DCI component as described with reference to FIGS. 7 through 10.

At 1720, the UE may monitor a downlink control channel associated with the service type based on the configuration for the service type and receipt of the activation indicator. The operations of 1720 may be performed according to the methods described herein. In some examples, aspects of the operations of 1720 may be performed by a downlink monitoring component as described with reference to FIGS. 7 through 10.

At 1725, the UE may receive a downlink message associated with the service type in accordance with the configuration for the service type. The operations of 1725 may be performed according to the methods described herein. In some examples, aspects of the operations of 1725 may be performed by a downlink service receiver as described with reference to FIGS. 7 through 10.

Figure 18:
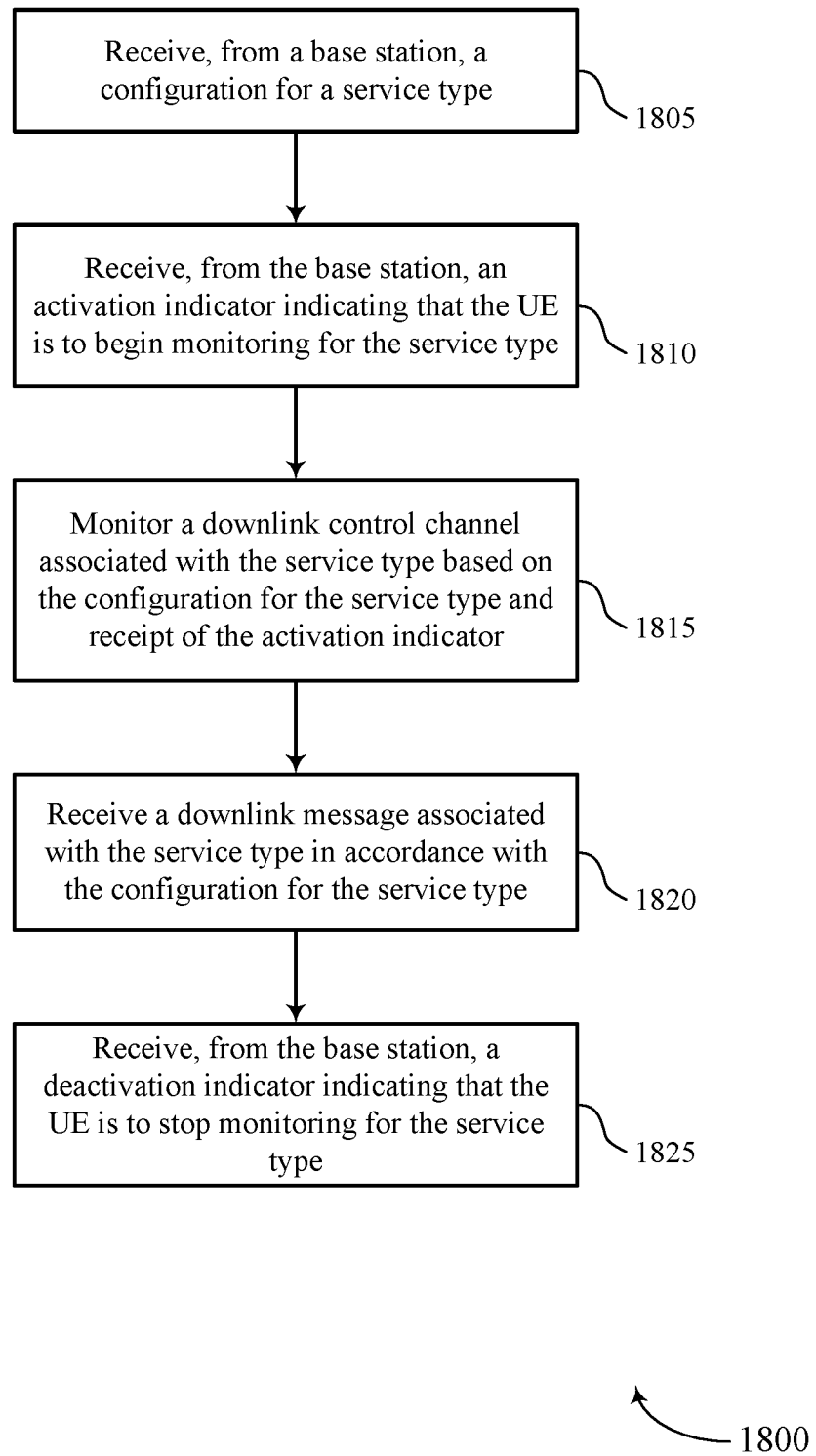

FIG. 18 shows a flowchart illustrating a method 1800 that supports fast activation and deactivation for low latency communications in accordance with aspects of the present disclosure. The operations of method 1800 may be implemented by a UE 115 or its components as described herein. For example, the operations of method 1800 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a configuration for a service type. The operations of 1805 may be performed according to the methods described herein. In some examples, aspects of the operations of 1805 may be performed by a service configuration receiver as described with reference to FIGS. 7 through 10.

At 1810, the UE may receive, from the base station, an activation indicator indicating that the UE is to begin monitoring for the service type. The operations of 1810 may be performed according to the methods described herein. In some examples, aspects of the operations of 1810 may be performed by a service activation component as described with reference to FIGS. 7 through 10.

At 1815, the UE may monitor a downlink control channel associated with the service type based on the configuration for the service type and receipt of the activation indicator. The operations of 1815 may be performed according to the methods described herein. In some examples, aspects of the operations of 1815 may be performed by a downlink monitoring component as described with reference to FIGS. 7 through 10.

At 1820, the UE may receive a downlink message associated with the service type in accordance with the configuration for the service type. The operations of 1820 may be performed according to the methods described herein. In some examples, aspects of the operations of 1820 may be performed by a downlink service receiver as described with reference to FIGS. 7 through 10.

At 1825, the UE may receive, from the base station, a deactivation indicator indicating that the UE is to stop monitoring for the service type. The operations of 1825 may be performed according to the methods described herein. In some examples, aspects of the operations of 1825 may be performed by a service deactivation receiver as described with reference to FIGS. 7 through 10.

Figure 19:
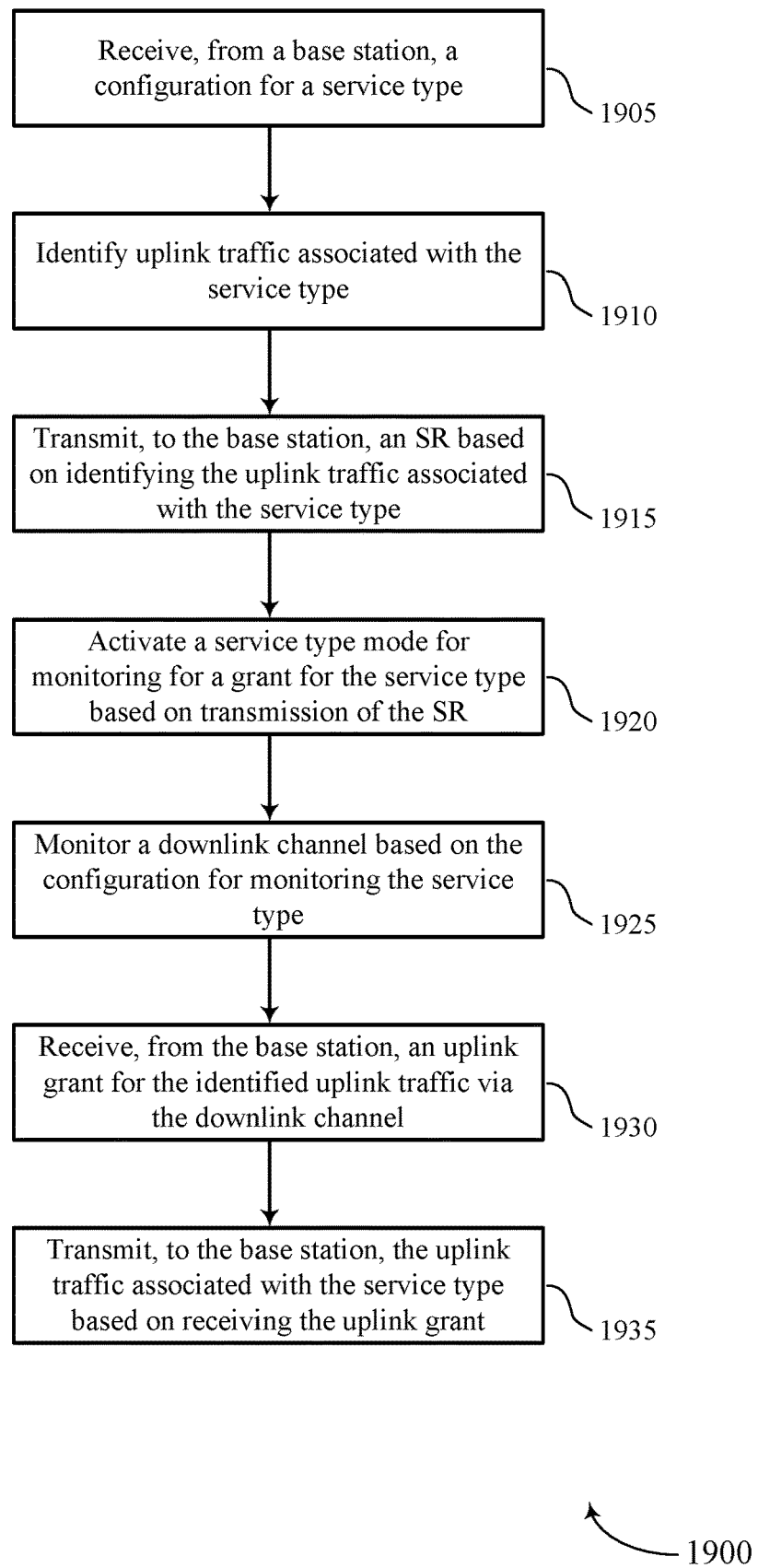

FIG. 19 shows a flowchart illustrating a method 1900 that supports fast activation and deactivation for low latency communications in accordance with aspects of the present disclosure. The operations of method 1900 may be implemented by a UE 115 or its components as described herein. For example, the operations of method 1900 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a configuration for a service type. The operations of 1905 may be performed according to the methods described herein. In some examples, aspects of the operations of 1905 may be performed by a service configuration receiver as described with reference to FIGS. 7 through 10.

At 1910, the UE may identify uplink traffic associated with the service type. The operations of 1910 may be performed according to the methods described herein. In some examples, aspects of the operations of 1910 may be performed by an uplink service identifier as described with reference to FIGS. 7 through 10.

At 1915, the UE may transmit, to the base station, an SR based on identifying the uplink traffic associated with the service type. The operations of 1915 may be performed according to the methods described herein. In some examples, aspects of the operations of 1915 may be performed by an SR component as described with reference to FIGS. 7 through 10.

At 1920, the UE may activate a service type mode for monitoring for a grant for the service type based on transmission of the SR. The operations of 1920 may be performed according to the methods described herein. In some examples, aspects of the operations of 1920 may be performed by a service activation component as described with reference to FIGS. 7 through 10.

At 1925, the UE may monitor a downlink channel based on the configuration for monitoring the service type. The operations of 1925 may be performed according to the methods described herein. In some examples, aspects of the operations of 1925 may be performed by a downlink monitoring component as described with reference to FIGS. 7 through 10.

At 1930, the UE may receive, from the base station, an uplink grant for the identified uplink traffic via the downlink channel. The operations of 1930 may be performed according to the methods described herein. In some examples, aspects of the operations of 1930 may be performed by a downlink service receiver as described with reference to FIGS. 7 through 10.

At 1935, the UE may transmit, to the base station, the uplink traffic associated with the service type based on receiving the uplink grant. The operations of 1935 may be performed according to the methods described herein. In some examples, aspects of the operations of 1935 may be performed by an uplink service transmitter as described with reference to FIGS. 7 through 10.

Figure 20:
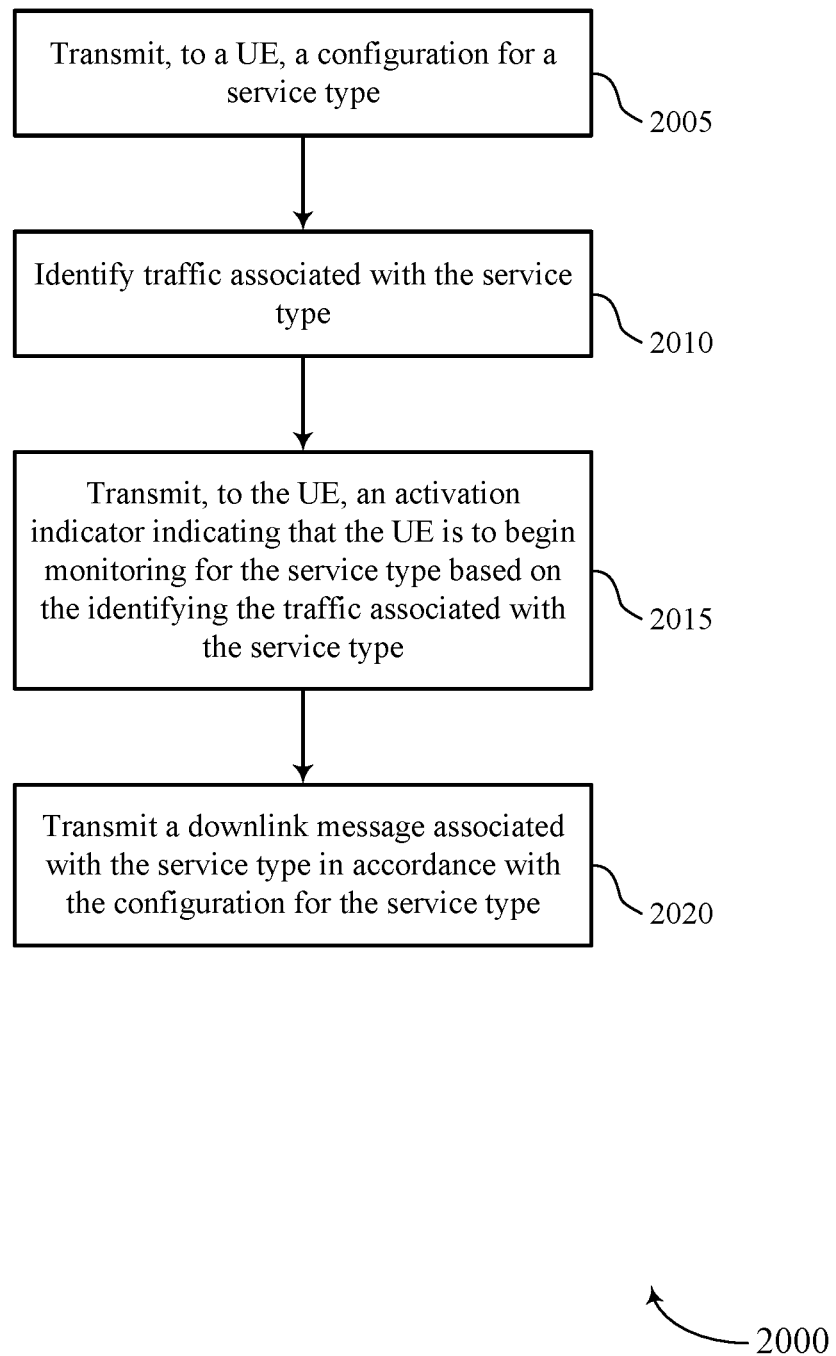

FIG. 20 shows a flowchart illustrating a method 2000 that supports fast activation and deactivation for low latency communications in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a configuration for a service type. The operations of 2005 may be performed according to the methods described herein. In some examples, aspects of the operations of 2005 may be performed by a service configuration transmitter as described with reference to FIGS. 11 through 14.

At 2010, the base station may identify traffic associated with the service type. The operations of 2010 may be performed according to the methods described herein. In some examples, aspects of the operations of 2010 may be performed by a downlink service identifier as described with reference to FIGS. 11 through 14.

At 2015, the base station may transmit, to the UE, an activation indicator indicating that the UE is to begin monitoring for the service type based on the identifying the traffic associated with the service type. The operations of 2015 may be performed according to the methods described herein. In some examples, aspects of the operations of 2015 may be performed by an activation component as described with reference to FIGS. 11 through 14.

At 2020, the base station may transmit a downlink message associated with the service type in accordance with the configuration for the service type. The operations of 2020 may be performed according to the methods described herein. In some examples, aspects of the operations of 2020 may be performed by a downlink service transmitter as described with reference to FIGS. 11 through 14.

Figure 21:
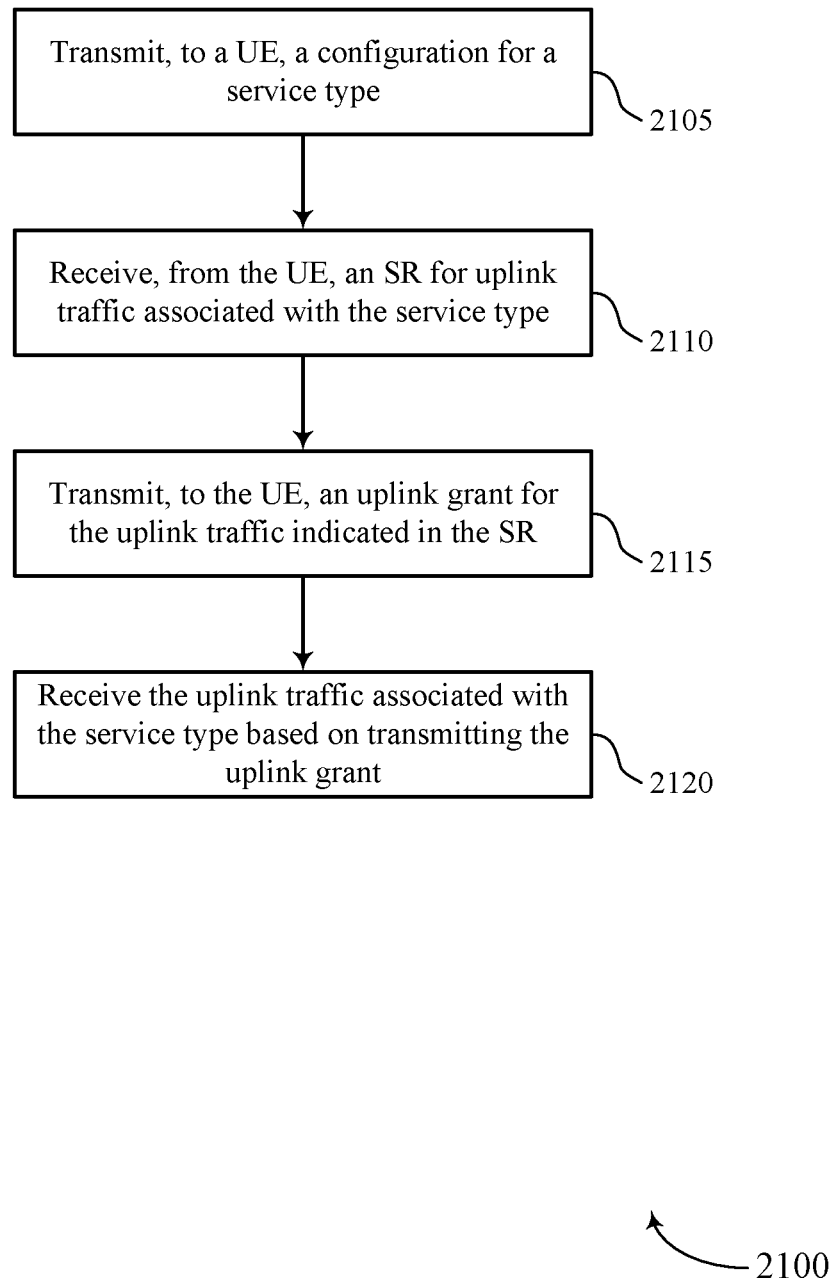

FIG. 21 shows a flowchart illustrating a method 2100 that supports fast activation and deactivation for low latency communications in accordance with aspects of the present disclosure. The operations of method 2100 may be implemented by a base station 105 or its components as described herein. For example, the operations of method 2100 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a configuration for a service type. The operations of 2105 may be performed according to the methods described herein. In some examples, aspects of the operations of 2105 may be performed by a service configuration transmitter as described with reference to FIGS. 11 through 14.

At 2110, the base station may receive, from the UE, an SR for uplink traffic associated with the service type. The operations of 2110 may be performed according to the methods described herein. In some examples, aspects of the operations of 2110 may be performed by an SR receiver as described with reference to FIGS. 11 through 14.

At 2115, the base station may transmit, to the UE, an uplink grant for the uplink traffic indicated in the SR. The operations of 2115 may be performed according to the methods described herein. In some examples, aspects of the operations of 2115 may be performed by an uplink grant component as described with reference to FIGS. 11 through 14.

At 2120, the base station may receive the uplink traffic associated with the service type based on transmitting the uplink grant. The operations of 2120 may be performed according to the methods described herein. In some examples, aspects of the operations of 2120 may be performed by an uplink service receiver as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving, from a base station, a configuration for a service type;
monitoring for a downlink control information (DCI) message with a first periodicity, the DCI message comprising an activation indicator;
receiving, from the base station, the DCI message comprising the activation indicator;
monitoring a downlink control channel associated with the service type based at least in part on the configuration for the service type and the DCI message comprising the activation indicator, the monitoring of the downlink control channel being in accordance with a second periodicity that is less than the first periodicity for monitoring for the DCI message; and
receiving a downlink message associated with the service type in accordance with the configuration for the service type.

2. The method of claim 1, wherein receiving the activation indicator comprises:
receiving, from the base station, a medium access control (MAC) control element (CE) deactivating a service type mode.

3. The method of claim 2, wherein receiving the MAC CE comprises:
receiving the MAC CE that includes a sub-header and an associated content field that includes a deactivation indicator corresponding to the service type.

4. The method of claim 3, wherein the associated content field comprises additional information for the service type.

5. The method of claim 2, wherein receiving the MAC CE comprises:
receiving the MAC CE that includes a sub-header corresponding to the service type without an associated content field, wherein the sub-header is the deactivation indicator which triggers a state change from a service type active mode to a service type inactive mode.

6. The method of claim 1, wherein receiving the DCI message comprises:
receiving a service type DCI format with the activation indicator, a combination of fields that is jointly interpreted as the activation indicator, or a combination thereof.

7. The method of claim 1, wherein the DCI message comprises a radio network temporary identifier (RNTI) associated with the service type.

8. The method of claim 1, further comprising:
receiving, from the base station, a deactivation indicator indicating that the UE is to stop monitoring for the service type.

9. The method of claim 8, wherein receiving the deactivation indicator comprises:
receiving a DCI message that includes a service type DCI format with the deactivation indicator.

10. The method of claim 8, wherein receiving the deactivation indicator comprises:
receiving a DCI message that includes a combination of fields that is jointly interpreted as the deactivation indicator.

11. The method of claim 1, wherein receiving the activation indicator comprises:
receiving additional information to update the configuration for the service type.

12. The method of claim 1, wherein receiving the configuration for the service type further comprises:
receiving a value for a deactivation timer associated with the service type.

13. The method of claim 12, further comprising:
initiating the deactivation timer based at least in part on receiving the activation indicator.

14. The method of claim 13, further comprising:
deactivating the service type based at least in part on the deactivation timer expiring, not expecting a downlink hybrid access request (HARQ) retransmission, no data in a HARQ buffer for an uplink retransmission, no uplink data for the service type, or a combination thereof.

15. The method of claim 12, further comprising:
adjusting the deactivation timer based at least in part on not receiving a service type communication associated with the service type within a scheduling occasion for the service type communication.

16. The method of claim 1, further comprising:
receiving a semi-persistent scheduling (SPS) configuration for uplink and downlink communications associated with the service type; and
receiving an SPS activation indicator indicating that the UE is to begin monitoring in accordance with the SPS configuration, wherein monitoring the downlink control channel associated with the service type is based at least in part on receipt of the SPS activation indicator.

17. The method of claim 1, wherein the configuration for the service type comprises parameters for a physical downlink control channel (PDCCH), a physical downlink shared channel (PDSCH), a physical uplink control channel (PUCCH), a physical uplink shared channel (PUSCH), semi-persistent scheduling (SPS), a scheduling request (SR), or a combination thereof for the service type.

18. The method of claim 1, wherein:
the configuration for the service type is received via radio resource control (RRC) signaling; and
the service type comprises an ultra-reliable low latency communication (URLLC) service or a low latency service.

19. A method for wireless communications at a user equipment (UE), comprising:
receiving, from a base station, a configuration for a service type;
identifying uplink traffic associated with the service type;
transmitting, to the base station, a scheduling request (SR) associated with the service type based at least in part on identifying the uplink traffic associated with the service type;
activating a service type mode for monitoring for a grant for the service type based at least in part on transmission of the SR;
monitoring a downlink control channel based at least in part on the configuration for monitoring the service type and the activating the service type mode, the monitoring of the downlink control channel being in accordance with a periodicity that is less than a first periodicity for monitoring for downlink control information (DCI);

receiving, from the base station, an uplink grant for the identified uplink traffic in a DCI message associated with the service type via the downlink channel; and transmitting, to the base station, the uplink traffic associated with the service type based at least in part on receiving the uplink grant.

20. The method of claim 19, further comprising:

receiving, from the base station, a deactivation indicator indicating that the UE is to stop the service type mode; and deactivating the service type mode based at least in part on receiving the deactivation indicator.

21. The method of claim 20, wherein receiving the deactivation indicator further comprises:

receiving a medium access control (MAC) control element (CE) or a DCI message that indicates a stop to the service type mode.

22. The method of claim 19, further comprising:

activating a physical downlink control channel (PDCCH) configuration associated with the service type based at least in part on transmitting the SR; and monitoring the downlink channel based at least in part on the PDCCH configuration associated with the service type.

23. The method of claim 22, wherein the PDCCH configuration comprises at least one of a control resource set configuration and a search space configuration.

24. The method of claim 19, wherein the DCI message includes a service type DCI format.

25. The method of claim 19, wherein:

the configuration for the service type is received via radio resource control (RRC) signaling; and the service type comprises an ultra-reliable low latency communication (URLLC) service or a low latency service.

26. An apparatus for wireless communications at a user equipment (UE), comprising:

a processor, memory coupled with the processor; and instructions stored in the memory and executable by the processor to cause the apparatus to:

receive, from a base station, a configuration for a service type;

monitor for a downlink control information (DCI) message with a first periodicity, the DCI message comprising an activation indicator;

receive, from the base station, the DCI message comprising the activation indicator;

monitor a downlink control channel associated with the service type based at least in part on the configuration for the service type and the DCI message comprising the activation indicator, the monitoring of the downlink control channel being in accordance with a second periodicity that is less than the first periodicity for monitoring for the DCI message; and receive a downlink message associated with the service type in accordance with the configuration for the service type.

27. An apparatus for wireless communications at a user equipment (UE), comprising:

a processor, memory coupled with the processor; and instructions stored in the memory and executable by the processor to cause the apparatus to:

receive, from a base station, a configuration for a service type;

identify uplink traffic associated with the service type;

transmit, to the base station, a scheduling request (SR) based at least in part on identifying the uplink traffic associated with the service type;

activate a service type mode for monitoring for a grant for the service type based at least in part on transmission of the SR;

monitor a downlink control channel based at least in part on the configuration for monitoring the service type and the activating the service type mode, the monitoring of the downlink control channel being in accordance with a periodicity that is less than a first periodicity for monitoring for downlink control information (DCI);

receive, from the base station, an uplink grant for the identified uplink traffic in a DCI message scrambled by associated with the service type via the downlink channel; and transmit, to the base station, the uplink traffic associated with the service type based at least in part on receiving the uplink grant.

* * * * *